US010643480B2

United States Patent
Sherry et al.

(10) Patent No.: US 10,643,480 B2
(45) Date of Patent: May 5, 2020

(54) METHOD AND APPARATUS FOR PROBABILISTIC ALERTING OF AIRCRAFT UNSTABILIZED APPROACHES USING BIG DATA

(71) Applicant: George Mason University, Fairfax, VA (US)

(72) Inventors: Lance Sherry, Fairfax, VA (US); John Shortle, Oak Hill, VA (US); Zhenming Wang, Fairfax, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 239 days.

(21) Appl. No.: 15/491,671

(22) Filed: Apr. 19, 2017

(65) Prior Publication Data
US 2017/0301247 A1    Oct. 19, 2017

Related U.S. Application Data

(60) Provisional application No. 62/324,406, filed on Apr. 19, 2016.

(51) Int. Cl.
| | | |
|---|---|---|
| *G08G 5/02* | (2006.01) | |
| *G08G 5/00* | (2006.01) | |
| *G06N 7/00* | (2006.01) | |
| *G06N 20/00* | (2019.01) | |
| *G06N 3/04* | (2006.01) | |

(52) U.S. Cl.
CPC ............. *G08G 5/025* (2013.01); *G06N 7/005* (2013.01); *G06N 20/00* (2019.01); *G08G 5/0021* (2013.01); *G08G 5/0091* (2013.01); *G06N 3/0436* (2013.01)

(58) Field of Classification Search
None
See application file for complete search history.

(56) References Cited

U.S. PATENT DOCUMENTS

| | | | | |
|---|---|---|---|---|
| 7,068,187 B2* | 6/2006 | Ishihara | ............... | G05D 1/0676 340/945 |
| 7,436,323 B2* | 10/2008 | Ishihara | ............... | G01C 23/00 340/951 |
| 8,116,923 B2* | 2/2012 | Ishihara | ............... | G08G 5/025 701/14 |
| 8,346,412 B2* | 1/2013 | Lacaze | ............... | G01C 23/00 244/187 |
| 9,499,279 B2* | 11/2016 | He | ............... | B64D 45/04 |
| 2012/0150426 A1* | 6/2012 | Conway | ............... | G08G 5/0026 701/120 |
| 2015/0294573 A1* | 10/2015 | Conner | ............... | G01C 21/00 701/408 |

(Continued)

OTHER PUBLICATIONS

De Boer et al. "The Automatic Identification of Unstable Approaches From Flight Data" (Year: 2014).*

*Primary Examiner* — Abdhesh K Jha
(74) *Attorney, Agent, or Firm* — Ballard Spahr LLP

(57) ABSTRACT

Traditional approaches to predicting aircraft trajectories using kinematic models cannot work due to the complexity of the approach maneuver including flaps/slats, landing gear, ATC vectors, winds, and other traffic. The methods and systems disclosed can utilize Big Data Analytics (e.g., massive amounts of data of flights on each approach) to nowcast the approach stability given the state of the flight prior to the 1000'/500' check points.

20 Claims, 21 Drawing Sheets

(56) References Cited

U.S. PATENT DOCUMENTS

| | | | |
|---|---|---|---|
| 2016/0090193 A1* | 3/2016 | He | B64D 45/04 340/971 |
| 2016/0107766 A1* | 4/2016 | He | B64D 45/08 701/7 |
| 2017/0243495 A1* | 8/2017 | Moravek | G08G 5/0039 |

* cited by examiner

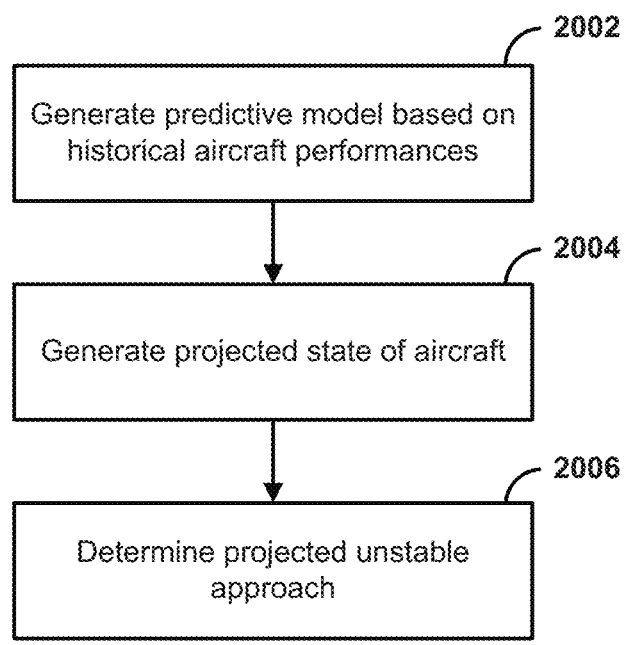

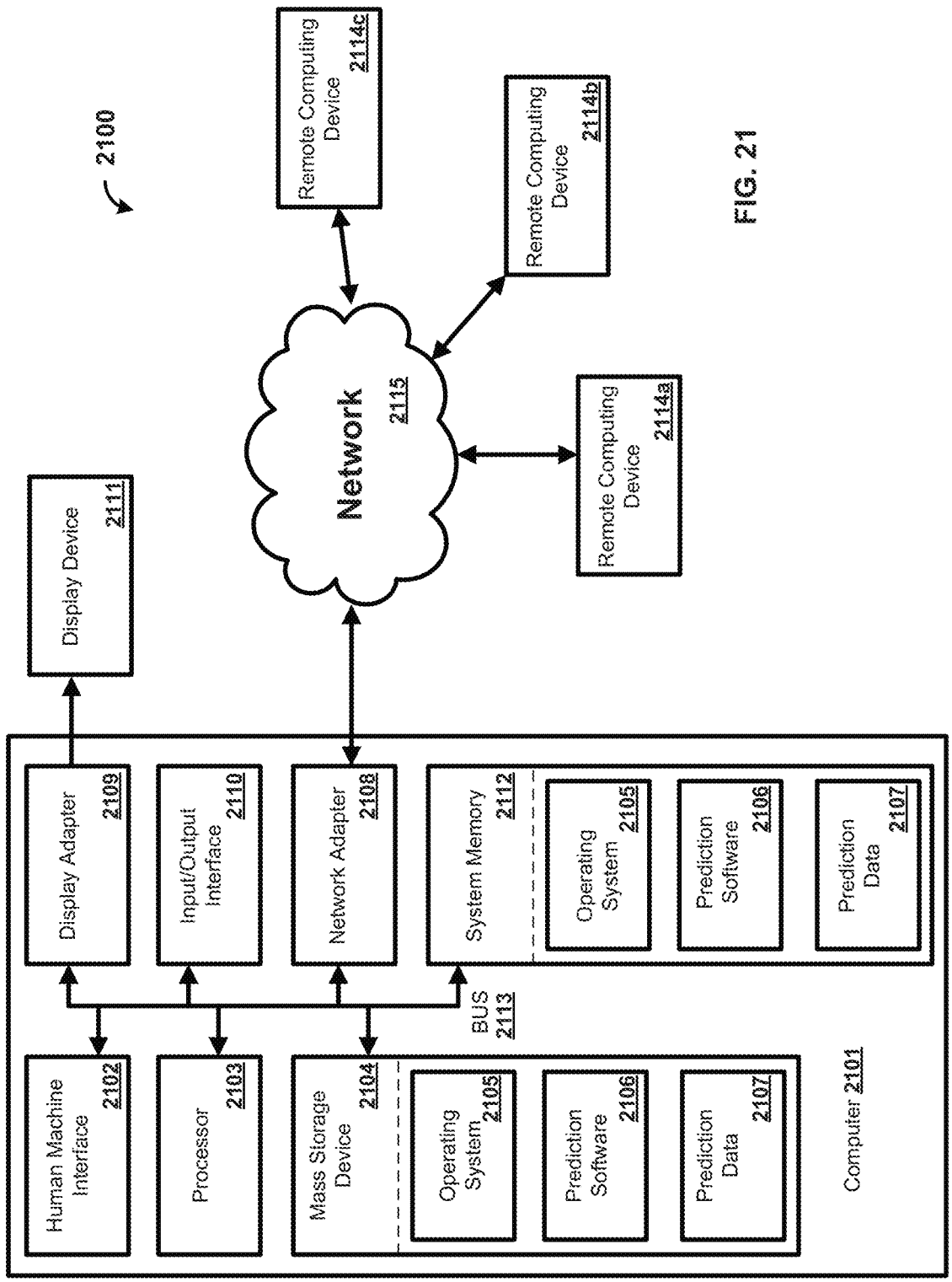

METHOD AND APPARATUS FOR PROBABILISTIC ALERTING OF AIRCRAFT UNSTABILIZED APPROACHES USING BIG DATA

CROSS REFERENCE TO RELATED PATENT APPLICATION

This application claims priority to U.S. Provisional Application No. 62/324,406 filed Apr. 19, 2016, herein incorporated by reference in its entirety.

BACKGROUND

For each flight, an aircraft is required to perform an approach and landing. Sixty six percent of all accidents occur during the approach phase. To mitigate this problem, airlines require pilots to check the status of the trajectory for "stability" at 1000 feet and 500 feet above ground level. The stable approach criteria include six independent sets of data located on displays on the flight deck. If the stable approach criteria are not met, the pilot should abort the approach and fly a "go-around." A go-around increases monetary flight costs and significantly increases pilot workload, so if there is doubt about whether the approach is stable or not, pilots assume it is stable and proceed with the approach. There is not one single indication that the approach is considered stable (the pilot has to look in 6 different locations), and by the time the pilot checks these criteria it is too late. These and other shortcomings are addressed by the present disclosure.

SUMMARY

It is to be understood that both the following general description and the following detailed description are exemplary and explanatory only and are not restrictive. Provided are methods and systems that can provide a single indicator of whether stabilized approach criteria have been met. In aspect, the methods and systems can provide information prior to 1000' and 500' check points as to whether the flight will meet stabilized approach criteria. The methods and systems enable pilots to make adjustments to avoid an unstable approach.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 20 is a flowchart of an example method;
and
FIG. 21 is a block diagram of a computing device.

DETAILED DESCRIPTION

Figure 1:
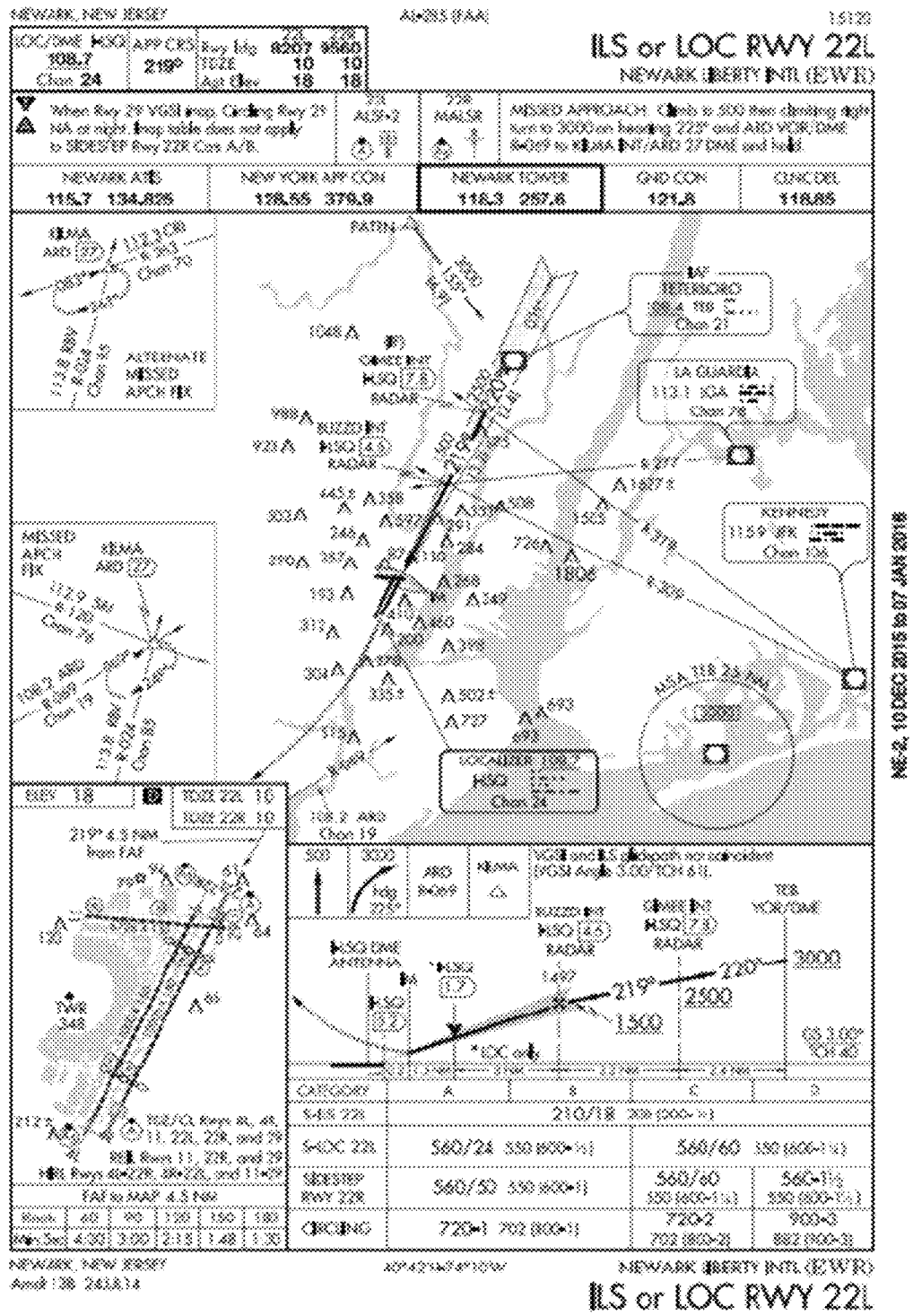
FIG. 1 is a sample approach chart.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

LITERATURE REVIEW

The approach-and-landing is one of the most complex procedures in airline flight operations. According to the International Civil Aviation Organization (ICAO), 47% of fatal accidents and 40% of onboard fatalities appear in the final approach and landing phase for worldwide operations (ICAO 2014). To avoid flying an unstable approach, the Standard Operating Procedures (SOPs) of airlines and regulators have established specific criteria for stabilized approaches. In general, these stabilized approach criteria require aircraft to be on the correct track (i.e., on the runway centerline and on the approach glide-path), within an appropriate range of a reference airspeed (e.g. ±10 knots), and within an appropriate range of a required rate of descent (e.g. <1000 ft/min). If any of these criteria is not satisfied at the stabilization altitude of 1000' AGL under Instrument Meteorological Condition (IMC) or 500' AGL under Visual Meteorological Conditions (VMC), the procedure requires the flight crews to perform a go-around to abort the approach. Failing to execute this procedure may lead to potential risk events such as controlled flight into terrain (CFIT) or a runway excursion. Due to the complex nature of the approach phase, there is a need to nowcast unstable approach events prior to reaching the stabilization altitude, e.g., at 10 nm, 6 nm, or 3.5 nm from runway threshold. Flight crews knowing a potential unstable approach may occur will have lead time to check and correct the aircraft trajectory to reduce the risk. This disclosure focuses on developing methods for nowcasting unstable approaches prior to the stabilization altitude.

Unstable Approaches and Their Risks

As one of the most complex procedures, the approach-and-landing phase serves a key function in bringing aircraft from airborne to runway landing. Flight crews must configure the aircraft appropriately for the maneuvers required by each trajectory segment to maintain a lift-generating energy state, coordinate the required trajectory to achieve the flight plan, remain within the constraints of the navigation procedure, maintain separation with other flights, and coordinate immediate and future trajectories with ATC. An example approach chart is shown in FIG. 1, which shows the complexity of the approach and landing procedures in detail.

A stabilized approach is a key feature to a safe approach and landing operation. The Flight Safety Foundation (FSF) indicates that an unstable approach is a causal factor in 66% of 76 approach-and-landing accidents and serious incidents worldwide (FSF 1999). Several well-known accidents related to an unstable approach include the Asiana Airlines Flight 214 in 2013, the Turkish Airlines Flight 1951 in 2009, and the Southwest Airlines Flight 1455 in 2000.

In the Asiana Airlines Flight 214 accident, a Boeing 777-200ER crashed on final approach into San Francisco International Airport (SFO) on Jul. 6, 2013. According to the accident report by the National Transportation Safety Board (NTSB), the approach of the flight was not stabilized and the airplane did not initiate a go-around (NTSB 2014). When the airplane reached 5 nm, it was above the desired 3-degree glide-path. This situation continued during the final approach. Asiana's SOP procedures dictates that an approach must be stabilized when an aircraft reaches 500' AGL. However, at 500', the airplane was still above the desired glide-path, and the airspeed had been decreasing rapidly to reach the proper approach speed of 137 knots. The rate of descent was about 1,200 ft/min which is significantly higher than the baseline value of 700 ft/min to maintain the desired glide-path. As the unstable approach continued, the airplane kept descending at an excessive rate, causing the airplane to fly below the glide-path. At about 200' AGL, the flight crews became aware of the situation. However, they did not initiate a go-around until the airplane was below 100', at which point the airplane did not have the performance capability to execute a go-around. This resulted in a contact with the sea wall prior to runway.

In another accident, Turkish Airlines Flight 1951 crashed into a field approximately 0.8 nm from the runway while landing at Amsterdam Schiphol Airport on Feb. 25, 2009. The airplane flew high and fast, intercepting the glide-path from above. Also, the flight captured the runway centerline late at 5.5 nm. Due to the automated reaction triggered by a faulty radio altimeter, the engine power was decreased to idle during approach. The flight crew did not realize the problem until it was too late to recover from the low speed. The aircraft stalled and crashed. In this accident, flying an unstable approach was a contributing factor.

For the runway overrun accident of Southwest Airlines Flight 1455 on Mar. 5, 2000, the leading factors included the steep glide-path angle and the high approach speed.

These accidents illustrate the importance of a stabilized approach. Unstable behaviors such as steep glide-path angle, short glide-path interception, high approach speed and improper speed change can cause unstable approaches and lead to potential landing risks. It is necessary to have a methodology to identify these potential risks and alert the flight crews before they can occur.

Stabilized Approach Criteria

To help flight crews establish stabilized approaches, it is necessary to specify a list of requirements that are clearly defined as standard operation procedures to follow. In general, the concept of a stabilized approach is characterized by flying on the correct track (i.e., runway centerline and glide-path), within an appropriate range of reference airspeed, and within an appropriate range of required rate of descent. The criteria in SOPs proposed by different airlines and regulators all follow this basic concept but are different in the details. The following is an example of the stabilized approach criteria given by the FAA (FAA 2003). To be stabilized, all of the following criteria should be maintained:

The aircraft is flying on the correct track (lateral & vertical).

The aircraft is in the proper landing configuration.

The air speed is within the acceptable range as specified in the operating manual.

The rate of descent is no greater than 1000 feet per minute (fpm).

After intercepting the glide-path intercept, the pilot flying requires no more than normal bracketing corrections to maintain the correct track and desired profile to land within the touchdown zone, e.g. bank angle <30°, ±300 ft/min deviation from the target rate of descent.

The power setting is appropriate for the landing configuration selected, and is within the permissible power range.

Flights are required to meet these criteria by 1000' in IMC or 500' in VMC with all appropriate briefings and checklists accomplished. An unstable approach is characterized by a failure to meet one or more of the previous requirements. An aircraft not meeting all the criteria by the stabilization altitude is required to abort the landing and execute the published missed approach procedure.

Figure 2:
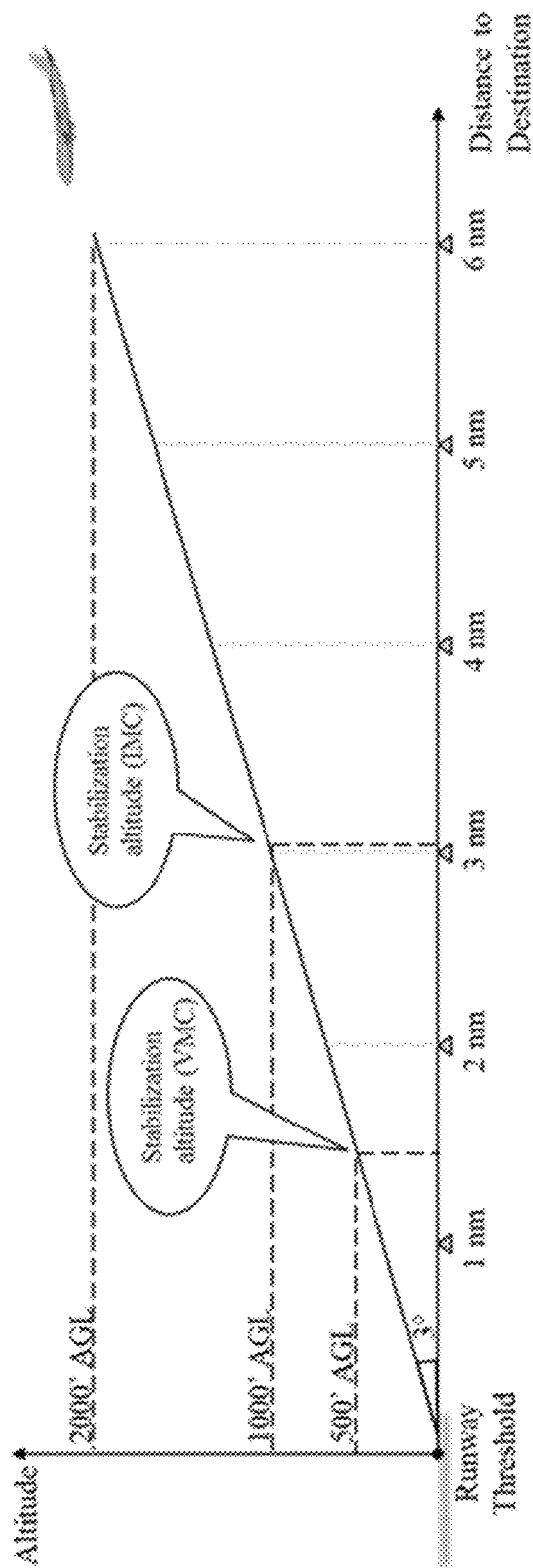
FIG. 2 is a typical approach profile.

A typical vertical profile for the approach is shown in FIG. 2, with the stabilization check points at 1000/500' shown. According to the stabilized approach criteria, a landing aircraft should be stabilized by reaching 1000' AGL (at about 3 nm from the runway threshold for a 3-degree glide-path) under IMC or 500' AGL (at about 1.5 nm) under VMC; otherwise a go-around is mandated.

Operations

During approach, the flight crews are required to monitor a rapidly evolving situation during the approach phase and to make split second decisions based on a large number of factors. Given the complexity in the coordination of trajectory and aircraft energy, checking the stabilization criteria at 1000'/500' is too late. Alerting the flight crew of a potential unstable approach before the aircraft reaches the stabilization altitude can give the crew the necessary lead time to check and correct the aircraft trajectory to avoid an unstable approach. However, currently used indicators in the FMS are for monitoring the current state of the flight. Kinematic models, although used in the FMS to predict the future aircraft state, are not practical in nowcasting unstable approaches as these models cannot account for various discrete events that occur during flight progress, for example, flap/slat and ATC clearances. Therefore, there is a need for developing a nowcasting methodology to identify potential unstable approaches.

Figure 3:
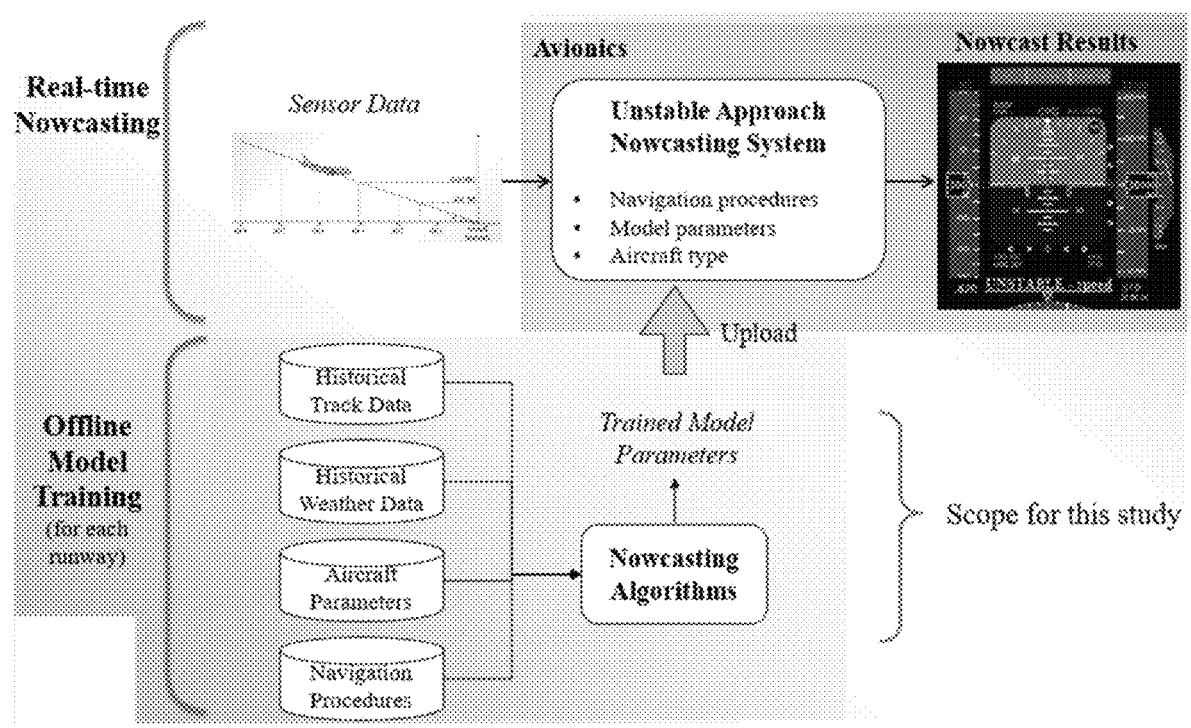
FIG. 3 is a concept of operations.

The present disclosure relates to the use of historical flight track data weather data, navigation procedure data, and aircraft performance data to build a prediction model for nowcasting the risk of unstable approaches before the stabilization altitude. This operation is demonstrated in FIG. 3. The model training phase is offline using historical data. The output of the nowcast algorithm is the prediction model with trained parameters, which is specific to each landing runway. The models with trained parameters of target runways are uploaded to the avionics. With the real-time sensor data collected onboard, the nowcasting system calculates the probability of experiencing unstable approach events after 1000/500' AGL. If the nowcast result is positive (i.e. unstable), an indicator on the Primary Flight Display (PFD) is activated with the corresponding information of a potential unstable approach. Flight crews with this message on the PFD are expected to take actions to adjust the aircraft trajectory accordingly to avoid a potential unstable approach.

Disclosed is a methodology for nowcasting unstable approaches prior to the stabilization altitude. Key questions addressed are listed below:

How can unstable approaches be defined and detected with publicly available data sets to best reflect the stabilized approach criteria?

What methods can be applied for nowcasting unstable approach events?

What features can be derived from the data and used for model inputs?

How well do the nowcasting models perform?

This disclosure can use surveillance track data for analysis. This approach is "worst-case" in the sense that there are better (but not publicly available) data sets with higher fidelity and more fields (e.g., Flight Data Recorder (FDR) data) that would be expected to yield better results. This disclosure relates to the module of off-line model training.

Gaps in the Literature and Unique Contributions

In summary, there has not been an existing methodology for nowcasting unstable approach events. Related literature on this topic includes trajectory prediction, anomalous flight detection, and approach performance analysis. Trajectory prediction methods are based on point-mass models or kinematic models, which do not consider external factors such as ATC instructions. Anomaly detection methods can detect potential unstable approaches but real-time identification of actual unstable approaches cannot be achieved. Methods for approach performance analysis assess the risks of related unstable events but do not directly apply to the task of nowcasting.

Given these gaps in nowcasting unstable approach events, example contributions of this disclosure are summarized below:
Development of a method to identify unstable approaches from integrated data of flight tracks, wind conditions, navigation procedures, and aircraft parameters,
Development of a nowcasting method via a conditional probability method,
Development of a nowcasting method via supervised learning,
Evaluation and comparison of the nowcasting methods.

Summary of the Methodology

Figure 4:
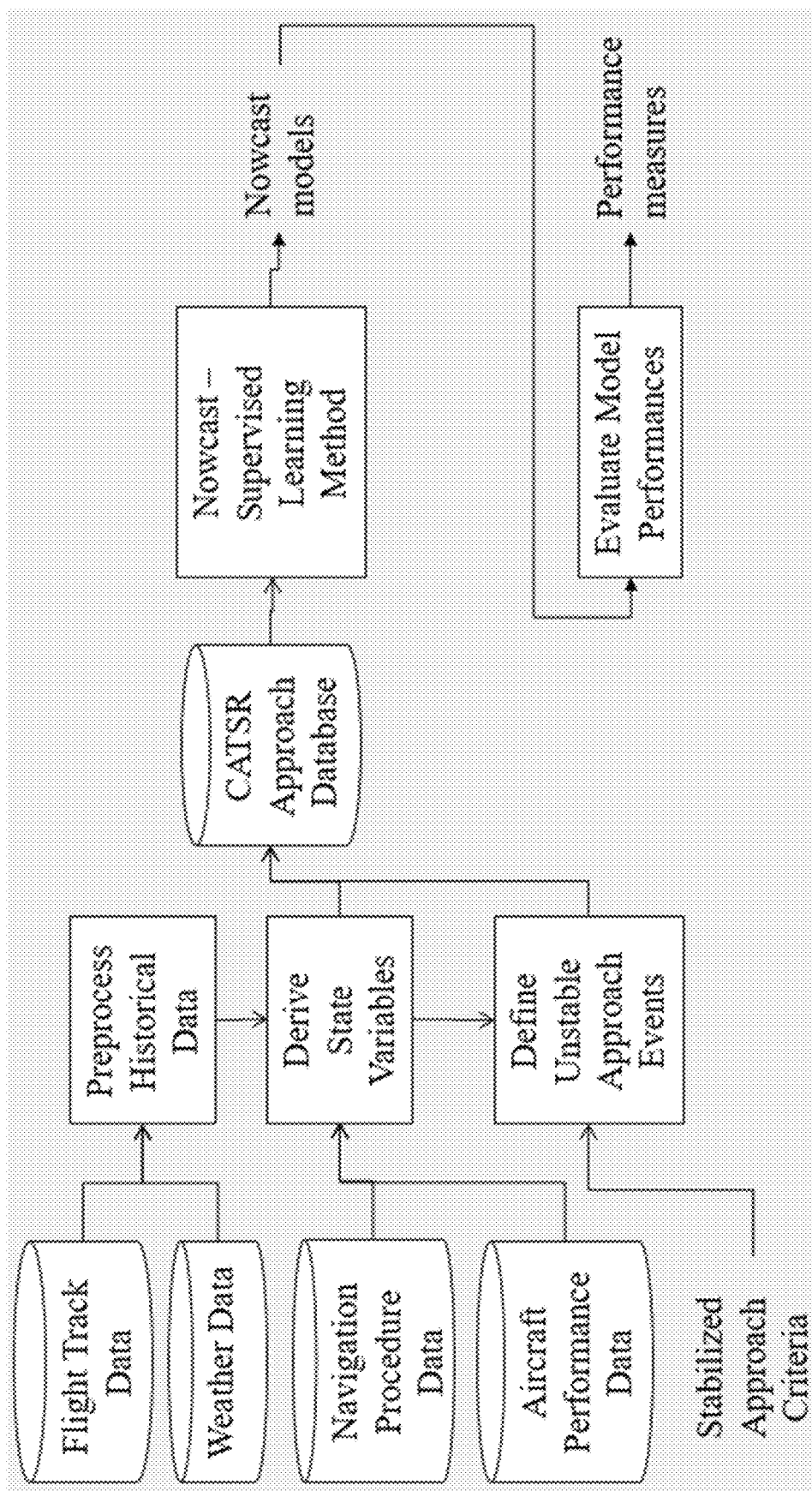
FIG. 4 is a methodology overview.

This disclosure uses archived historical data to develop models for predicting unstable approach events at locations prior to the stabilization altitude. FIG. 4 summarizes the presently disclosed framework. The first step is to process and integrate historical flight tracks, weather conditions, navigation procedures, and aircraft parameters. From these processed and integrated data, aircraft state variables at key locations (e.g. 6 nm, 1000', 500', and landing) are calculated. Stabilized approach criteria are applied to identify unstable approaches from this integrated data set.

Then, to nowcast these detected unstable approach events, two methods are applied. The first model is based on historically observed probabilities of unstable approaches under different conditions. If the probability of an unstable approach under a given set of conditions is significantly higher than the overall aggregate probability, then an alert of a potential unstable approach is sent to the flight crew. This method does not perform well with a limited amount of historical data. The second method uses supervised learning. The method starts with selecting features and training the parameters of the models to minimize the cost function. To evaluate the performance of the nowcasting models, several measures are studied to quantify their prediction performances.

Summary of Results

A case study is conducted at Newark International Airport (EWR) Runway 22L. First, the frequencies of unstable approach events are observed. Some observations are summarized below:
47.3% of landing flights experienced unstable approaches after reaching 1000' AGL. This percentage drops to 17.5% for 500' AGL.
26.8% of landing flights experienced an excessive decrease in airspeed from 1000' AGL to runway threshold. This percentage drops to 4.1% for 500' AGL.
19.5% of landing flights acquired the runway centerline from the right side after 1000' AGL. This percentage drops to 8.5% for 500' AGL.

In terms of nowcasting unstable approaches, the best performance achieved is by the supervised learning method with all developed features. The nowcasting performances for unstable approaches after 1000' at 10 nm, 6 nm, and 3.5 nm are summarized below.
At 10 nm. 53.9% of unstable approaches can be correctly nowcasted: 62.5% of nowcasts of an unstable approach are correct.
At 6 nm. 64.7% of unstable approaches can be correctly nowcasted: 78.4% of nowcasts of an unstable approach are correct.
At 3.5 nm, 75.3% of actual unstable approaches can be correctly nowcasted; 85.9%) of nowcasts of an unstable approach are correct.

Generally the nowcasting performance improves as the nowcasting location gets closer to the stabilization altitudes. Nowcasting by the conditional probability method is less powerful. Larger amount of data sets will help in improving the performance of the conditional probability method. The supervised learning method with fewer features also lowers the performance measures, indicating that adding appropriate features may further improve the current model.

By studying the sensitivity of features in the trained models, key features are identified which have a large impact on unstable approaches. For example, at 6 nm, these features include lateral deviation, airspeed, and crosswind speed.

Applications

A methodology is disclosed that relates to a nowcasting system. This system can be integrated in the FMS. The preliminary concept of operations is for the pilot monitoring to monitor the nowcast outputs of this system as the aircraft starts the approach process. If there is a nowcast message indicating a potential unstable event, the pilot will notify the pilot flying to consider an adjustment of the current trajectory to decrease the probability of an unstable approach.

Many tasks should be completed before this system can be realized. First, system validations are needed. One way of testing the system is to embed the nowcast system into a flight simulator. The purpose is to test the hypothesis that fewer unstable approaches are experienced by a flight crew using the nowcasting system compared to flight crews not using the system. Even if the performance of the system is validated, it will be necessary to carefully study the interface design with the current FMS. Many human-in-the-loop experiments need to be conducted before the realization of this nowcasting system.

LITERATURE REVIEW

Provided is a summary of existing literature related to this disclosure. The first section covers an overview of stabilized approaches including concepts and definitions as well as field studies to estimate the fraction of approaches that are unstable. The next sections describe literature relevant to identifying and predicting unstable approaches including algorithms for aircraft trajectory prediction, anomaly detection, and approach performance analysis. These papers use flight track data to study different perspectives of unstable events during the approach. Finally, the limitations of these methods for nowcasting unstable approaches are discussed.

Stabilized Approach

The FAA Safety Team defines the stabilized approach concept as follows (FAA 2006): "A stabilized approach is one in which the plot establishes and maintains a constant angle glide-path towards a predetermined point on the landing runway." For flight crews, a stabilized approach requires that the airplane descend on final approach at a constant rate and airspeed, and travel in a straight line toward a fixed point on the ground ahead.

In the flying lessons by Turner (2011), the concept of a stabilized approach is elaborated with instructions prior to and after the final approach fix (FAF). Prior to reaching the FAF, the aircraft is put into landing configuration (gear down and flaps set), and airspeed is reduced to $V_{REF}$ or some target just above $V_{REF}$. At the start of the descent, the pilot should adjust attitude and power to establish a descent while maintaining airspeed, flying in this configuration and attitude all the way to touchdown.

The definitions above for a stabilized approach are from the technical perspective of flight crews. A more rigorous way to define the concept is by setting a set of well-defined criteria Airlines and regulators have specified minimum acceptable criteria for stabilized approaches. The criteria can be different in the details but generally share the same spirit. An example set of stabilized approach criteria proposed by the Flight Safety Foundation (FSF 2010) is summarized below:

The aircraft is on the correct flight path.
Only small changes in heading/pitch are required to maintain the flight path.
The aircraft speed is not more than $V_{REF}$+20 knots indicated airspeed and not less than $V_{REF}$.
The aircraft is in the correct landing configurations.
The rate of descent is no greater than 1,000 fpm.
The power setting is appropriate.
All briefings and checklists have been conducted.
For an ILS approach, the aircraft must capture the glideslope and localizer.
The stabilized approach should be achieved after reaching 1,000 feet above airport elevation in IMC, 500 feet above airport elevation in VMC. An approach failing to meet the criteria requires an immediate go-around.

If any of the criteria is not met by the stabilization altitude, the approach to land should be discontinued and a go-around is executed.

The main goals of the stabilized approach include the following (Turner 2011):

Predicting the performance of different aircraft using the same technique,
Increasing situational awareness,
Detecting and correcting glide-path deviations,
Increasing the ability to establish crosswind correction, and
Landing in the touchdown zone at the proper speed.

Currently, there have not been agreements achieved on the proportion of unstable approaches. A survey (DGAC 2006) suggests that 3% of approaches are unstable. By analyzing the flight data collected from FSF's corporate flight operational quality assurance program, Darby (2010) indicates that the incidence of unstable approaches is 4.5% in 2009, down from 12.8% in 2006. During line-operation safety audits, observers on the flight decks of 4,532 commercial flights between 2002 and 2006 found that 5% of approaches were unstable (Merritt 2006). It was also noted that only 5% of these observed unstable approaches initiated a go-around.

Possible causal factors leading to unstable approaches include fatigue, pressure of the flight schedule, improper ATC instructions, a late runway change, a late takeover from the autopilot, inadequate awareness of wind conditions, etc. (Turner 2011). Moriarty et al. (2014) further analyze the potential causes for unstable approaches from a system perspective. The authors indicate that the major cause of unstable approaches lies in the mismatched goals from different stakeholders. Rather than explain unstable approaches as being solely due to the actions of the pilots, the study identifies a collection of factors external to the flight deck that have significant impacts on the safety of an approach. Human decision-making in a high-workload situation tends to continue unstable approaches to landing, which further increases the risk. A published speed profile is recommended to unify the goals of pilots and air traffic controllers.

An effective method to detect unstable approaches is to examine flight track data at different locations, e.g. speed, position, etc. In recent years, the availability of surveillance track data has provided such convenience. For example, Wang et al. (2015) study the statistics of unstable events using surveillance track data. It showed that 27.8% of the approaches exhibited more than 10 knots change in ground-speed after reaching 1000' AGL.

The following sections will cover some existing studies that apply flight track data to predict aircraft trajectories, detect anomalous flights, identify specific types of unstable events, and conduct stochastic simulations. All these methods are related to the present disclosure in two ways:
1. The methods use flight track data.
2. The methods focus on risk events that are the causes or results of unstable approaches.

Aircraft Trajectory Prediction

Ideally, if the future trajectory of an aircraft can be predicted to a satisfactory accuracy level based on the current trajectory, then unstable approach events can be successfully predicted. However, the mechanism of prediction (i.e. based on aircraft performance models) becomes the major limit for their use in nowcasting unstable approaches.

Existing prediction methods include point-mass model, kinematic model, and others. A large amount of literature exists on the topic of trajectory prediction (Musialek et al. 2010). This section introduces a few of them.

A basic idea is to apply aircraft performance models to predict aircraft trajectories. The point-mass model applies aircraft motion equations. The inputs of the control system are thrust, flight path angle, and bank angle. The outputs of the model are the aircraft states containing the position of the aircraft mass point, speed vector, heading, and mass. Using point-mass model to predict aircraft trajectory is a major approach. For example, Rodriguez et al (2007) apply point-mass model for a 4D trajectory guidance model for descent phase of flight. Thipphavong et al. (2013) apply point-mass models to predict climbing trajectories using real-time radar track update with an adaptive weight algorithm which dynamically adjusts modeled aircraft weights on a per-flight basis to improve the predictions. The look-ahead time can be up to 12 minutes with the altitude profiles tested. With an update rate of 12 seconds, the quality of track data is a major limiting factor on the amount of improvement that can be achieved with the algorithm. Higher quality track data such as Automatic Dependent Surveillance—Broadcast (ADS-B) is expected to enhance the performance.

In kinematic models, only position and time rate of changes are modeled. The aircraft performance parameters are not included in the model. Uncertainties are introduced by adding pertubations following assumed stochastic distributions, e.g. human pilot flying parameters (roll rate, rate of descent, etc.). Literatures using kinematic models include Miquel et al. (2006) and McGovern et al. (2007).

The major limitation of these trajectory prediction methods is that they do not account for external factors which can affect the approach trajectory. Examples of such factors include air traffic control (ATC) clearances and changes in aircraft configurations (flap/slat extension). These factors are discrete in nature and do not directly appear in the models. Some regulated approach patterns such as short curve-in landing also belong to those external factors. Due to the complex nature of approach and landing procedures, the trajectory of an aircraft cannot be purely explained by a set of aircraft movement equations.

There are other models for trajectory prediction. For example, Richards (2002) applies a neural-network-based fuzzy inference system for improving the landing signal officer's decision making on an aircraft carrier. The goal is to project 2 seconds ahead of the current flight position. This method outperforms the polynomial extrapolation in predicting aircraft positions. Limitation of using this model in predicting unstable approaches is the short look-ahead time. The time from beginning of descent to final touchdown can take several minutes.

TABLE 1

Summary of Aircraft Trajectory Literatures

| Method | Literature | Description |
|---|---|---|
| Point-mass model | Rodriguez et al. 2007, Thipphavong et al 2013, etc. | Apply aircraft performance parameters toward realistic modeling of flight. |
| Kinematic model | Miquel et al. 2006, McGovern et al. 2007, etc. | Focus only on position, course, speed, and their time rate of changes. |
| Other model | Richards et al. 2002 | Apply neural network based fuzzy inference system to project 2 seconds ahead of current position. |

Table 1 summarizes several papers in the area of trajectory prediction. In summary, existing models for aircraft trajectory prediction have the drawback of missing the external uncertain factors in predicting unstable approach events. These external factors include ATC instructions, onboard configurations, or specific approach patterns regulated in the approach diagram. Therefore, it is not appropriate to use these models to predict unstable approaches at an early stage Anomalous Flights Detection Anomaly detection is an active research area in data mining (Chandola et al. 2009). It refers to the process of detecting inconsistent observations from the majority of a dataset. There are three major methods for addressing anomaly detection problems—the statistical method, the classification method, and the clustering method.

The statistical method assumes statistical distributions of data. Whether a data instance is anomalous depends on how well it fits the distribution. Due to the complexity and dependencies of unknown data, this method is not always applicable. The classification method is based on supervised learning. In the training phase, the classes are separated with boundaries created from learning the labeled data. Then, the trained classifier is used to assign test data into one of the specified classes. The clustering method identifies groups of data so that data in one group are more similar to each other than those in other groups. Anomalies are detected which do not belong to any group.

The air transportation system provides a rich field for anomaly detection. For example, the Flight Operational Quality Assurance (FOQA) program is implemented in many US airlines, which contains the main source of onboard recorded data (FAA 2004). The main purpose of FOQA is to improve airline operations and safety by analyzing detailed flight data that are daily recorded. Many flight parameters are recorded with different sampling rates. The FOQA data is evaluated through exceedance analysis using statistical method. The exceedance analysis identifies instances in which parameters exceed predefined limits under different conditions (Treder et al. 2004). A flight with a particular parameter value exceeding the predefined limit is labeled as anomaly.

Li et al. (2011) have used cluster analysis techniques to develop an unsupervised method to detect anomalous flights based on continuous flight parameters. Digital Flight Data Recorder (DFDR) can be used as a data source. The work does not need a predefined threshold for flight parameters and detects anomalous flights differing from the majority of flights by considering all available flight parameters. The time series of multiple flight parameter data are converted to a high dimensional vector. Cluster analysis of these vectors is conducted to identify anomalous flights which do not belong to any cluster. Anomalies are then reviewed by domain experts to determine their significance. Detected anomalous behaviors include high and low energy states, unusual pitch excursions, and abnormal flap settings.

Matthews et al. (2013) apply classification method for anomaly detection in FOQA data using algorithms of Multiple Kernel Anomaly Detection (MKAD). The work demonstrates the anomaly detection process on a large commercial aviation data set. Discoveries of anomalous flight behaviors include fleet level anomalies and flight level anomalies.

Onboard measured data are not publicly available. Researchers also use external flight track data to do anomalous flight detection. For example, Matthews et al. (2014) use surveillance track data to identify operationally significant flights. The work takes the features of latitude, longitude, altitude and the separation to closest aircraft for each trajectory. After detection of anomalous flights, subject matter experts are needed to determine which of them are significant. Additional supportive data such as ATC voice data is used to help identify the issues. Detected anomalous events with operational significance include runway switches, go-arounds, S-turns, too fast, too high, and intercept angle excessive etc.

However, anomaly detection methods are not practical in nowcasting unstable approaches for several reasons:
- There is a significant need for manual inspection after the fact. The methods cannot be used for real-time prediction.
- Only a small portion of detected anomalies turn out to be significant.

Approach Performance Analysis Methods

Other methods dealing with risk analysis in approach processes include statistical analysis, stochastic simulation, and heuristic methods. These methods do not directly apply to the task of nowcasting, but provide useful information for integrating the data sets, characterizing aircraft state variables, and defining specific risk events (e.g. go-around).

Statistical Analysis

Statistical properties of aircraft trajectories are the basis for track modeling and approach simulations. State variables such as lateral/vertical position, speed, and separation are fitted with probability distributions and treated as random variables. Of particular importance are the tail behaviors of the distributions which correspond to the extreme values of the flight track features. For example, an extraordinary small separation time between two successive arrivals or an extremely large lateral deviation from a predefined glide-path lead to higher probability of risks. By analyzing the track data, the distributions of the state variables can be fitted and the probability of extreme behaviors can be estimated.

A feature of arrival flight tracks is the position. Lateral and vertical position distributions can vary at different distances from the runway threshold along the glide-path for different approach types. The deviation and dispersion of flight tracks from the prescribed flight path can cause unstable approaches and lead to potential safety risk issues.

Hall et al. (2008) quantified the flight technical error of landing aircraft along the final approach segment under IMC at Lambert-St. Louis International Airport (STL) using Airport Surface Detection Equipment, Model X (ASDE-X) data and other sources of surveillance track data. Data are analyzed in terms of the distribution of the lateral and vertical deviations from the ideal glide-path as a function of distance from the runway. Mean and standard deviations are summarized and compared to the ICAO ILS specification tolerance, proved to be tighter than prescribed standards.

Zhang et al. (2010) investigated the cross-sectional position distributions of arrival flight tracks along glide-path at Hartsfield-Jackson Atlanta International Airport and O'Hare International Airport. The paper fits several types of probability density functions to lateral and vertical position distributions, among which, the normal distribution generally provides a good fit. The results show similar distributions between two airports under IMC for both lateral and vertical positions. And the results are similar to results at STL in Hall et al. (2008), which has provided some indication that the distributions observed under IMC may be generalized and extrapolated to other airports.

Another statistical feature of arrival tracks is the separation between consecutive arrivals. Separation values can be obtained by measuring time intervals between landing flights to the same runway at fixed distances from the runway threshold. For example, Haynie (2002) and Xie (2005) study the time separation by direct observation of aircraft operations data. Andres et al. (2001) and Rakas et al. (2005) use radar data to study the statistical distributions of separations. Jeddi et al. (2006) use multilateration data to study the landing operations at Detroit Metropolitan Wayne County airport. Algorithms are developed to extract landing process variables including Landing Time Intervals (LTI), Inter-Arrival Distance (IAD) and Runway Occupancy Time (ROT) from the data. LTI and lAD are fit by Erlang distributions, and ROT is fit by a beta distribution. Shortle et al. (2010) study the probability distributions for time-separations of landing aircraft at Detroit Metropolitan Wayne County Airport using multilateration data. The tail behaviors of separation distribution are studied. The left tail of the separation distribution decays faster than a normal distribution, which is positive from a safety perspective.

Stochastic Simulation

Stochastic simulation methods can be applied to quantitatively study the probability of some risk events that are the causes or results of unstable approaches. These methods, based on the statistical analysis, assume specific probability density functions for key features of flight tracks. Well-defined dependency relationships between variables are also needed.

Simulation of the approach and landing process can be conducted by generating hypothetical flight tracks with statistical features derived from surveillance track data. The safety metrics are expressed in probabilities of specific risk events which may lead to or result from unstable approaches.

An example application of simulation methods is in studying the separation violations. For example. Jeddi et al. (2007) have analyzed the optimal level of landing operations on a single independent runway with fitted distributions for ROT and LTI obtained from previous research. The two types of risks with landing procedures considered are the wake vortex encounter and the simultaneous runway occupancy. The modeling of the landing operations assumes that the go-around procedures are strictly enforced when separation distances fall below a specified value. Models are developed to maximize the number of successful landing operations while mitigating the risk factors. In Shortle et al. (2013), an interaction model between go-arounds and runway throughput is further proposed for modeling of runway landing operations with go-around process as an extension to the previous work. The stochastic model is based on the updated go-around rates (Sheriy et al. 2013).

Another application of stochastic simulation methods are for wake vortex encounter. Wake vortices are a major potential safety hazard for landing aircraft. Minimum separation requirements between landing aircraft must be ensured. Shortle et al. (2007) have developed a probabilistic method to assess the potential wake encounter probability for landing aircraft using different wake models and flight tracks data. The method to estimate the probability of a wake encounter is via a hybrid simulation method. The method directly uses real flight track data, while simulating the wake behavior using wake-evolution models. The frequency of wake events were estimated using one week of sample flight tracks. The results show how the probabilities of the risk events depend on atmospheric conditions and other factors. Based on this work, Wang et al (2012) conducted sensitivity analysis of potential wake encounters to stochastic flight track parameters, atmospheric parameters and parallel runway parameters. Aircraft locations were simulated using hypothetical probability distributions in dimensions of lateral position, vertical position, and separation time based on previous studies of the statistical characteristics of these variables. Wake behaviors were simulated using wake models with input parameters of airspeed, weight, and wingspan of aircraft, and atmospheric parameters etc. By integrating these two components together, it is possible to estimate the probability of a potential wake encounter. The results showed that the mean and variance of separation time and the variance in vertical position have big impacts on wake encounter.

Heuristic Methods

Heuristic methods, or rule-based method, can be developed according to specific rules to detect unstable risk events. For example, as a consequence event of unstable approaches, go-around is a standardized flight procedure to abort the approach when stabilized approach criteria are not met. Sherry et al. (2013) developed a heuristic method to study statistics and potential causes of go-arounds at Chicago O'Hare International Airport (ORD). The go-arounds are identified from surveillance track data by using the feature of cumulative turning angles. Potential leading factors are identified from voluntary pilot and air traffic controller reports, including airplane issues, traffic separation issues, weather issues, runway availability issues, and flight-crew-ATC interaction issues.

Rule-based methods can be good at detecting and discovering some risk events in a heuristic way. But these methods are not applicable in establishing relations between factors and results.

Summary of Literature Review

In summary, current literature on stabilized approach analysis using flight track data generally cover the following aspects: trajectory prediction, anomaly detection, and approach performance analysis. Their limitations or contributions are summarized in Table 2.

TABLE 2

Summary of Literature

| Method | Description | Contribution/limitation for nowcasting |
|---|---|---|
| Systematic overview, survey | Obtained statistics of unstable approach events. Analyzed potential causes for unstable approaches. | Provided concept, definition, reference statistics and potential causes for unstable approach events. |

TABLE 2-continued

Summary of Literature

| Method | Description | Contribution/limitation for nowcasting |
|---|---|---|
| Trajectory Prediction | Applied point-mass or kinematic models to predict trajectories. | External factors were not included in the model; Limited look-ahead time and accuracy level. |
| Anomaly detection | Detect anomalous flights which experienced potential unstable approaches. | Need manual inspection of significance afterwards, not for real-time. |
| Approach Performance Analysis | Detect, analyze and simulate approach performances. | Provide information for integrating the data sets, characterizing aircraft state variables, and defining specific risk events. |

The major gap for research is in developing methods to predict unstable approach events at an earlier stage before stabilization heights, for example, at 3.5 nm, 6 nm, or 10 nm prior to the runway threshold. Also, there is a need to study what types of features and unstable events can be identified using pubicly available data such as surveillance track data, since the onboard flight data are not widely available. A methodology is needed for deriving and analyzing key information contained in flight tracks and other related information sources to effectively predict unstable approaches given the state of aircraft before the stabilization altitude.

Specifically, to fill the gap for nowcasting unstable approaches, the disclosure relates to:

A methodology for identifying unstable approach events by processing and integrating publicly available surveillance track data, weather data, aircraft performance data, and navigation procedures.

A methodology for nowcasting unstable approach events, including a conditional probability method and a supervised learning method.

With the developed nowcasting models, the goal is to provide flight crews or other stakeholders with real-time unstable approach annunciations for their decision making before reaching 1000'/500' AGL.

Methodology

This section describes the methodology for nowcasting unstable approaches. The general approach is to use archived historical data to first obtain key state variables and identify unstable approaches, and then to develop models for predicting unstable approach events using the derived information. This methodology includes the following steps: obtaining and preprocessing data sources, deriving state variables, detecting unstable approach events, developing nowcasting models, and evaluating the performances of developed models. A methodology overview is presented in FIG. 4.

Data Sources

A plurality of data sources can be used. For example, four sources of data can be used. The primary source is surveillance track data from Terminal Radar Approach Control Facilities (TRACON), which contain the information of landing aircraft trajectories. Historical weather data are also obtained for wind information and airspeed derivation. Furthermore, navigation procedures and an aircraft performance database are included. Preprocessing and integrating these data sets becomes the first step in nowcasting unstable approaches.

Flight Track Data

Flight track information is contained in many sources, for example, FDR data, FOQA data, ADS-B, and surveillance radar, etc. Some of these data sources contain additional information such as aircraft configuration. However, not all of the data sources are publicly available. The main requirement for the methodology is that the flight data contain the aircraft type as well as a set of track points comprising time, latitude, longitude, altitude, combinations thereof, and the like.

An example of such a data source is the surveillance track data from the N90 TRACON. The raw format of this data contains more than ten fields. Each row is a record of a radar hit. Key fields are extracted for basic flight track information, including the track index, aircraft type, seconds past midnight (GMT), latitude, longitude and altitude (Table 3). The track index defines each flight track with a unique code. The ICAO code for the aircraft used by each flight is stored in the aircraft type field. The time field contains the cumulative number of seconds past midnight (GMT). The time steps can be in integer or fractional values in seconds. For surveillance radar, the sampling rate is every 4 to 5 seconds. The longitude and latitude provides the horizontal position of an aircraft at each time stamp. These values are in decimals and the precision level is to the fifth digit after the decimal point. For this dataset, the altitude readings are in numbers of flight levels, i.e., multiples of 100 feet. The integer readings in this column indicate that the precision level of the altitude information is no better than 100 feet.

TABLE 3

Summary of Key Fields in Surveillance Track Data

| Field | Description | Sample value |
|---|---|---|
| Track index | Uniquely identify a track | 20070111000339N902242BTA2087 |
| Aircraft type | Type of aircraft | A310 |
| Seconds past midnight (GMT) | Time in seconds past midnight (GMT) | 297 |
| Latitude | Latitude in decimal | 40.70711 |
| Longitude | Longitude in decimal | −74.14420 |
| Altitude | Altitude in 100 ft. | 15 |

Some preprocessing procedures are needed to clean up and standardized the data. The implementation of these steps will be introduced in Section 3.2.

Weather Data

Historical weather conditions are obtained from the METAR database, in which the raw measures are from the National Oceanic and Atmospheric Administration. The available fields include temperature, wind speed, wind direction, gust, dew point, humidity, pressure, visibility etc. Example information used in the disclosed methods is the wind condition. The METAR data is sampled hourly.

Airport Data and Navigation Procedures

To evaluate how well the landing tracks follow a prescribed path, the basic navigational information of a landing runway is needed, e.g., runway centerline heading, glide path angle, and the position of the FAF. Airport and runway information is obtained from the National Flight Data Center (NFDC) of the FAA, which is the official repository responsible for the collection, validation and quality control of aeronautical information in the NAS. The major fields obtained include the name, latitude, longitude, elevation, and runway information of the airport. For each runway, details are collected including the runway name, true alignment, glide path angle, threshold crossing height (above ground level), latitude, longitude, and elevation of the runway threshold. Table 4 summarizes the collected airport and runway data.

TABLE 4

Airport and Runway Data

| Field | Description | Sample value |
|---|---|---|
| Airport Name | Three-letter airport identifier | EWR |
| Airport location | Latitude and longitude of the center of airport | Latitude 40.639751, longitude −73.778925 |
| Airport elevation | Elevation of airport above mean sea level | 17.6 ft. |
| Runway name | Name of runway | 13R |
| True alignment | Runway heading angle, north = 0, clockwise | 121 degrees |
| Visual glide-path angle | Visual glide-path angle | 3 degrees |
| Runway elevation | Elevation of runway threshold | 12.5 ft. |
| Threshold crossing height | The prescribed crossing height at runway threshold for landing aircraft, above ground level | 73 ft. |
| Runway threshold location | Latitude and longitude of runway threshold | latitude 40.645339, longitude −73.810057 |

In addition to runway parameters, approach charts are also studied to extract the approach procedure. The approach chart is specific for a given approach type and landing runway. FIG. 1 shows an example approach chart specifying the approach procedures for ILS approaches to Runway 22L at Newark Liberty International Airport (EWR). Key locations such as the initial approach fix are specified. Further extracting procedures are discussed in Section 3.2.

Aircraft Performance Data

Aircraft type information is contained in the flight track data. Aircraft parameters of a landing flight can provide useful information. The parameters of each aircraft model can be obtained from the Base of Aircraft Data (BADA), which is developed and maintained by EUROCONTROL (2012) through active cooperation with aircraft manufacturers and airlines. For this study, the key parameters used are the aircraft type name, weight class, and maximum takeoff weight (MTOW). Five weight classes are defined based on the maximum takeoff weight: Super, Heavy, B757, Large, and Small. Table 5 shows the sample input aircraft parameters.

TABLE 5

Sample Aircraft Parameters

| Aircraft Type | Wake Class | Maximum Takeoff Weight (kg.) |
|---|---|---|
| A300 | Heavy | 165002 |
| A306 | Heavy | 165002 |
| A30B | Heavy | 142002 |
| A310 | Heavy | 164022 |
| A318 | Large | 68001 |
| A319 | Large | 75501 |
| A320 | Large | 77001 |
| A321 | Large | 93002 |
| A322 | Large | 93002 |
| ... | ... | ... |

Data Processing and Integration

Processing and integrating data are the necessary steps for deriving key state variables (features), for detecting unstable approach events, and building the nowcasting models.

Preprocessing Flight Tracks

The raw data from different sources may contain formats and features which are incompatible. A cleaning procedure is needed to solve the issue. Example cleaning steps are as below:

1. Convert time format in raw data (e.g. "2011-01-17 19:08:09.300") to GMT cumulative seconds past midnight.
2. Convert GMT to local time.
3. Sort all flights first by track index, then by time (ascending).
4. Filter target airport arrivals by checking the coordinates of the last point in a flight track (i.e., to identify that the latitude and longitude are within a predefined range for a target airport).
5. If needed, filter target airline flights (airline information is contained in the track index).
6. Adjust tracks with ending time less than 0 seconds or greater than or equal to 86400 seconds (24 hours) past local midnight for each day.
7. Trim unused columns and rows.
8. Convert all units to the metric system.
9. Convert longitude and latitude to the Universal Transverse Mercator (UTM) Coordinate System.
10. Generate input flight data files and track data files with standardized format.

After these cleaning steps, the formats of the input flight data and track data are the same over all data sources. For Step 4, the raw data may have contained the destination airport, but for some sources this information can be incomplete. Therefore, a predefined range of latitude and longitude is needed to filter landing aircraft to the target airport. For example, the latitude range (41.773, 41.799) and longitude range (−87.768, −87.733) are used for Chicago Midway International Airport. As stated in Step 8, for convenience, all units in the data files can be converted to the metric system for computation. The outputs of the preprocessing are a flight data file and a track data file. The flight data file contains the flight track index, flight ID, and aircraft type used by each flight. The track data file stores all track-point information for each flight.

The original time series in raw data can have different sampling rates. For N90 TRACON data, the sampling rate is every 4 to 5 seconds. For C90 TRACON data, the data are sampled at a much lower and irregular rate. To unify the sampling rates, linear interpolation is conducted between successive data points to obtain updated tracks. For example, let $x_t$ represent the lateral position of the aircraft at time i. Suppose that i and j represent successive time stamps from the original data, with i<j (both i and j are integers, in seconds). To estimate the lateral position at an intermediate point, i+n<j, the following formula is applied:

Linear Interpolation $$x_{i+n=x_i+\frac{n}{j-i}(x_j-x_i)} \quad \text{Equation 1}$$

A similar process is used to obtain the interpolated points for vertical position.

Figure 5:
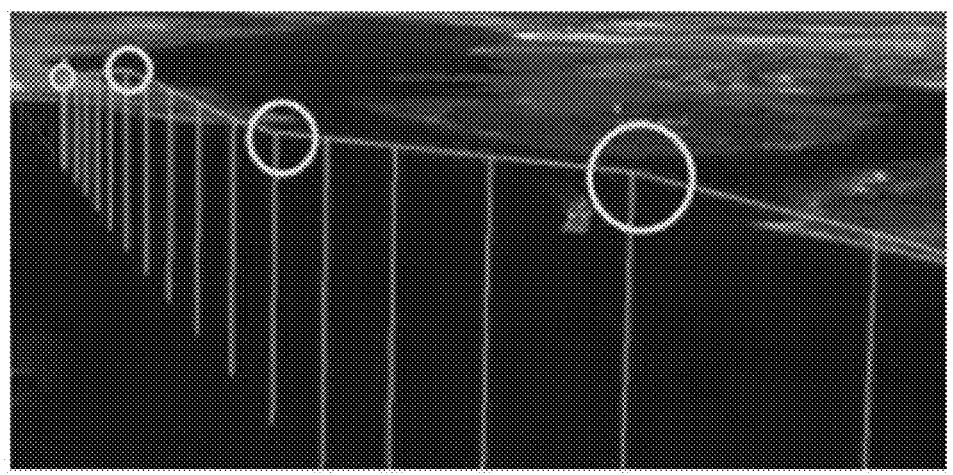
FIG. 5 is a representation of track points for linear interpolation.

The updated sampling interval is set at 1 second. FIG. 5 shows a comparison between the original track points and the interpolated track points, where the circled points are the original points and the other points are linearly interpolated.

Figure 6:
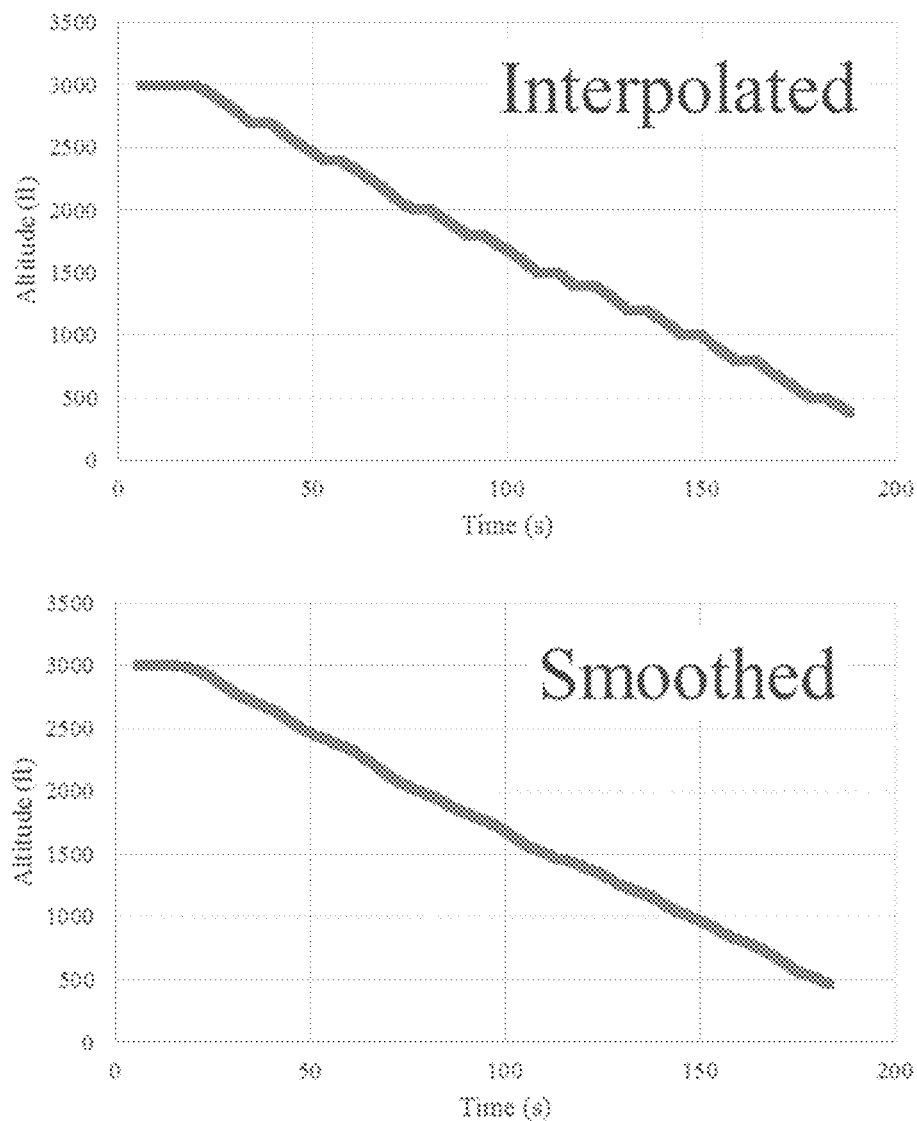
FIG. 6 is an example showing track smoothing in a vertical profile.
Figure 7:
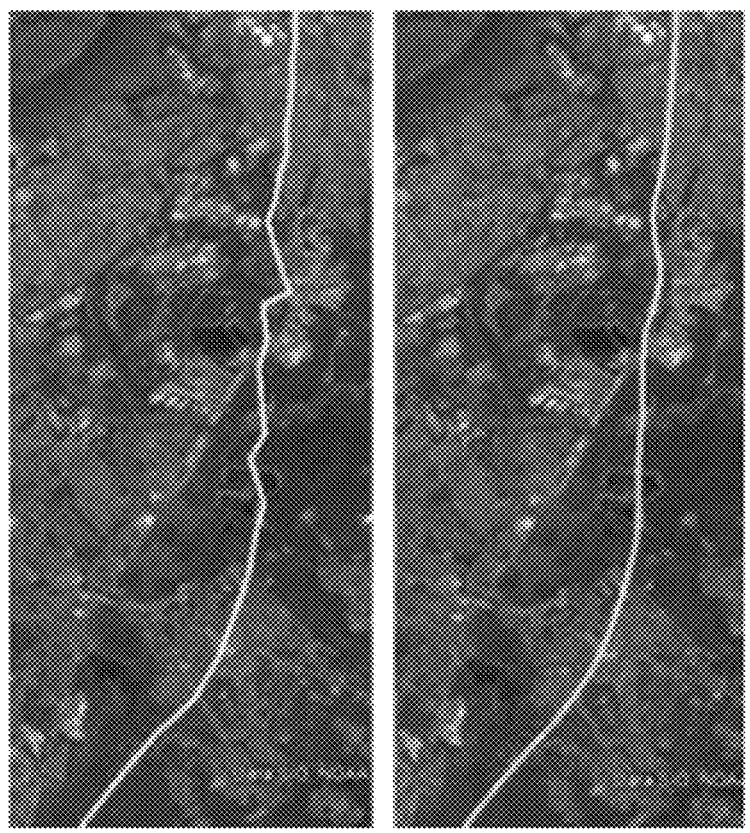
FIG. 7 is an example of track smoothing in a horizontal profile.

To reduce noise in the flight tracks, a smoothing procedure is applied in the vertical and horizontal dimensions. The smoothing procedure is applied via a running average with the following formula:

Track Smoothing $$x_i = \sum_{j=i-m}^{i+m} x_j \quad \text{Equation 2}$$

where $x_i$ represents the horizontal coordinate or altitude for track point at time stamp i. The parameter m indicates the half width of the averaging interval. This study uses m=5 seconds for track smoothing. Smoothing in the vertical profile is demonstrated in FIG. 6. The stepwise vertical profile in the original data is due to low altitude precision (multiples of 100 feet). Smoothing in the horizontal dimension is shown in FIG. 7. The lateral noise is reduced by smoothing.

To study unstable approaches, additional variables are needed for analysis besides time and position information. The following three variables are derived from raw positions data: ground speed, vertical speed, and heading angle.

The ground speed of an aircraft at some track point is estimated by simply averaging the ground speed of its two adjacent segments. For example, Equation 3 shows the calculation of the ground speed at $P_2$. In this equation, $v_{12}$ is the ground speed of adjacent segment connecting points $P_1$ and $P_2$, which is calculated in Equation 4. In Equation 4, $t_i$ is the time in seconds at point $P_i$. $x_i$ and $y_i$ are the Cartesian coordinates for Point i. Similarly, the vertical speed (i.e. rate of descent) at a track point can be estimated by averaging the vertical speed values of the two adjacent segments.

Ground Speed for Track Point $$v_2 = \frac{v_{12}+v_{23}}{2} \quad \text{Equation 3}$$

Ground Speed for Segment $$v_{12} = \frac{\sqrt{(x_1-x_2)2+(y_1-y_2)2}}{t_2-t_1} \quad \text{Equation 4}$$

Figure 8:
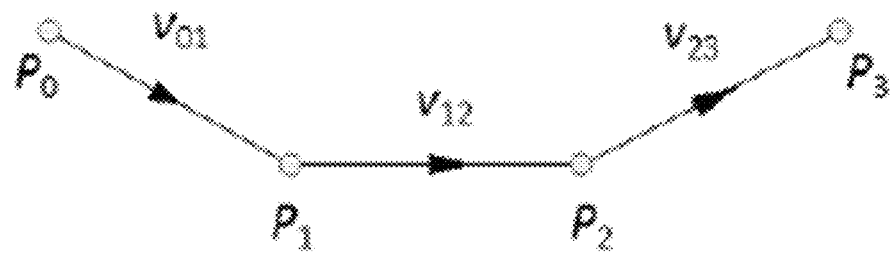
FIG. 8 is an example of calculation of ground speed.

Similarly, the vertical speed (i.e. rate of descent) at a track point can be estimated by averaging the vertical speed values of the two adjacent segments. A representation of calculating ground speed is shown at FIG. 8.

To reduce noise in estimating ground speed and vertical speed, we use an averaging interval similar to the process for smoothing the track data (Equation 2). The method of calculating averaged ground speed at point $P_j$ is summarized in the following formula:

Averaged Ground Speed $$GS(Pj) \sum_{i=j-\frac{n}{2}}^{j+\frac{n}{2}} v_{i/(n+1)} \quad \text{Equation 5}$$

Figure 9:
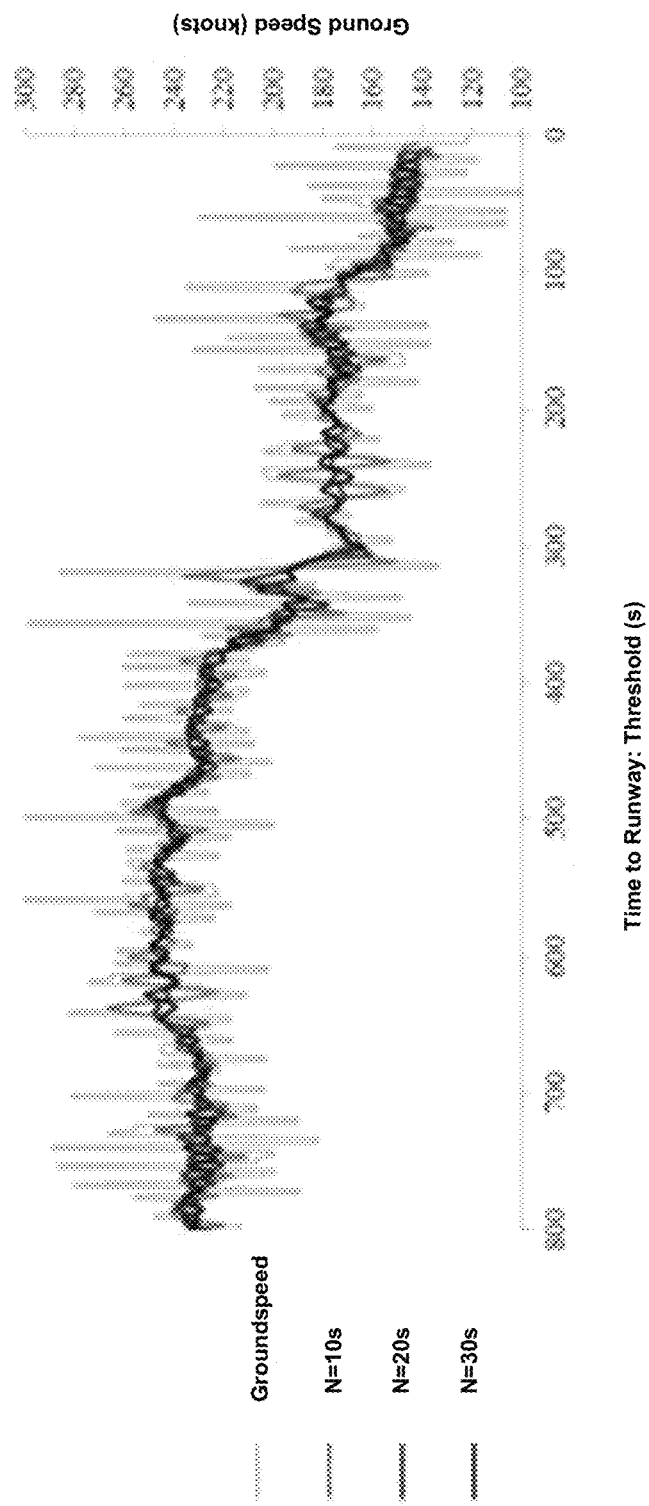
FIG. 9 is a graph of averaging time intervals and their effects on noise reduction for ground speed.

FIG. 9 shows the effect of using different averaging intervals for the smoothing, applied to the derived ground speed for an example track. As the length of the averaging interval increases, the noise is reduced. However, the ability to distinguish speed changes over short time intervals is also reduced. To preserve the original information and reduce the noise as much as possible, an averaging interval of n=30 seconds is chosen. The same noise reduction technique is applied to derive the averaged vertical speed at target track points.

Figure 10:
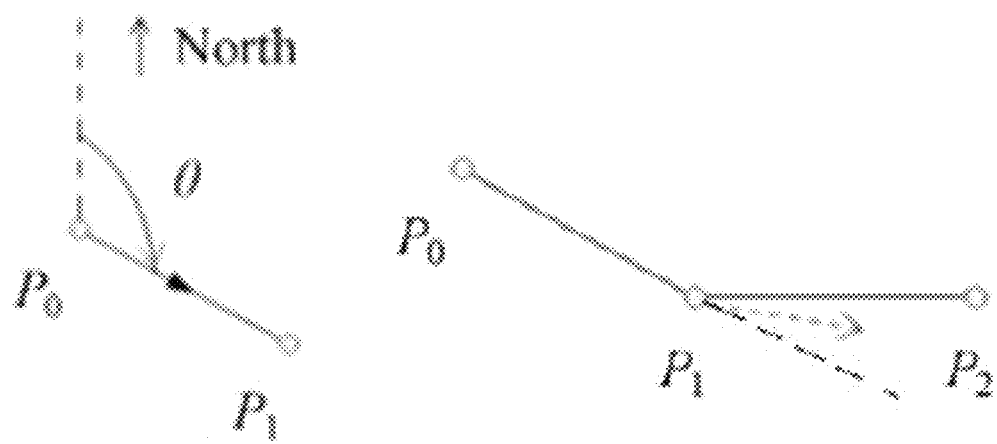
FIG. 10 is an example of calculation of a heading angle.

To derive the heading angle θ of a track point, define θ=0 for heading true north. Clockwise from the north, the value of θ (in radians) grows from 0 to 2π (FIG. 10). To calculate θ, we average the heading angles formed by the two adjacent segments. The heading angle of $P_1$ is either $(\theta_{01}+\theta_{12})/2$ or $(\theta_{01}+\theta_{12})/2+\pi$ depending on the situation, where $\theta_{01}$ and $\theta_{12}$ are the heading angles of segment connecting $P_0$ to $P_1$ and $P_1$ to $P_2$ respectively. The estimated heading direction at Point 1 is indicated by the dashed arrow in the right chart of FIG. 10.

Preprocessing Wind Data

Figure 11:
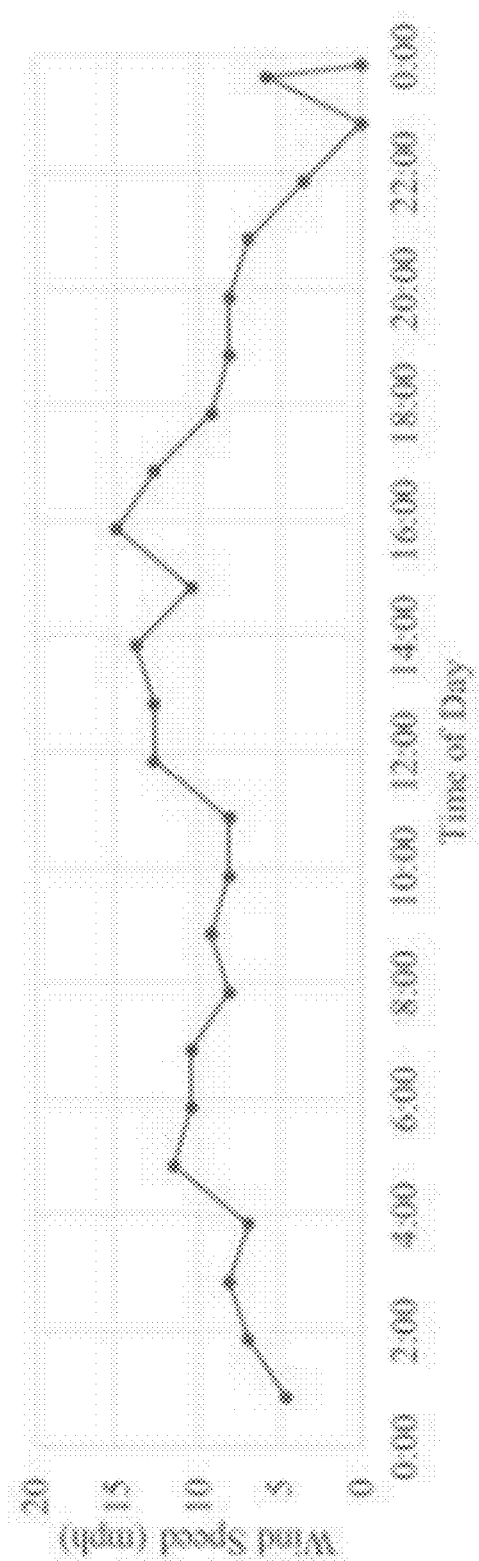
FIG. 11 is a graph of interpolated wind speed.

Wind speed, direction, and gust speed are updated hourly. A sample wind record for one day is shown in Table 6. To use the wind information at an arbitrary point in time, interpolation is needed. The linear interpolation for wind speed, direction, and gust follows the same form in Equation 1. A sample interpolated wind speed is demonstrated in FIG. 11.

TABLE 6

Sample METAR Wind Records

| Time (EDT) | Wind Dir | Wind Speed | Gust Speed |
|---|---|---|---|
| 12:51 AM | NNE | 4.6 mph | — |
| 1:51 AM | NNE | 6.9 mph | — |
| 2:51 AM | NE | 8.1 mph | — |
| 3:51 AM | NE | 6.9 mph | — |
| 4:51 AM | NNE | 11.5 mph | — |
| 5:51 AM | NE | 10.4 mph | — |
| 6:51 AM | NE | 10.4 mph | — |
| 7:51 AM | NE | 8.1 mph | — |
| 8:51 AM | ENE | 9.2 mph | — |
| 9:51 AM | East | 8.1 mph | — |
| 10:51 AM | East | 8.1 mph | — |
| 11:51 AM | SE | 12.7 mph | 20.7 mph |
| 12:51 PM | East | 12.7 mph | — |
| 1:51 PM | ESE | 13.8 mph | — |
| 2:51 PM | SE | 10.4 mph | 18.4 mph |
| 3:51 PM | ESE | 15.0 mph | — |
| 4:51 PM | SSE | 12.7 mph | — |
| 5:51 PM | South | 9.2 mph | — |
| 6:51 PM | SSE | 8.1 mph | — |
| 7:51 PM | South | 8.1 mph | — |

TABLE 6-continued

Sample METAR Wind Records

| Time (EDT) | Wind Dir | Wind Speed | Gust Speed |
|---|---|---|---|
| 8:51 PM | ENE | 6.9 mph | — |
| 9:51 PM | SE | 3.5 mph | — |
| 10:51 PM | Calm | Calm | — |
| 11:39 PM | SSW | 5.8 mph | — |
| 11:51 PM | Calm | Calm | — |

Figure 12:
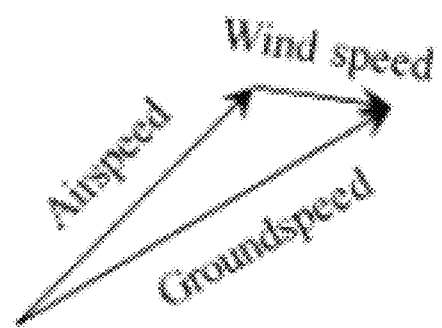
FIG. 12 is a representation of the relationship between airspeed, wind speed, and ground speed.

One major purpose of including wind data is to derive airspeed instead of using groundspeed to better represent the aircraft state. Airspeed is obtained by using Equation 6. The relationship between airspeed, groundspeed, and windspeed vectors is presented in FIG. 12.

Deriving Airspeed $$\text{airspeed} = \text{groundspeed} - \text{windspeed} \qquad \text{Equation 6}$$

Figure 13:
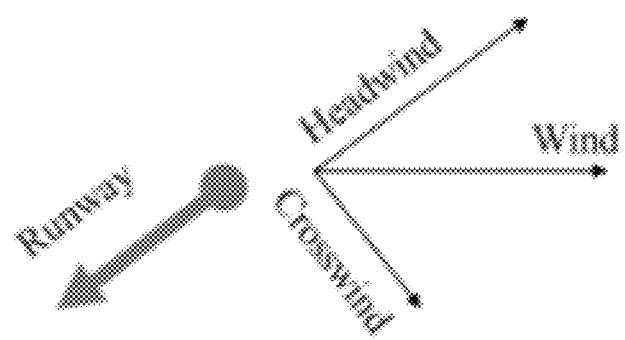
FIG. 13 is a representation for deriving crosswind and headwind.

Also, given the alignment of a specific landing runway, the crosswind and headwind for a landing aircraft can be derived. An example decomposition of wind speed is shown in FIG. 13.

Building Wireframe Approach Zone

Figure 14:
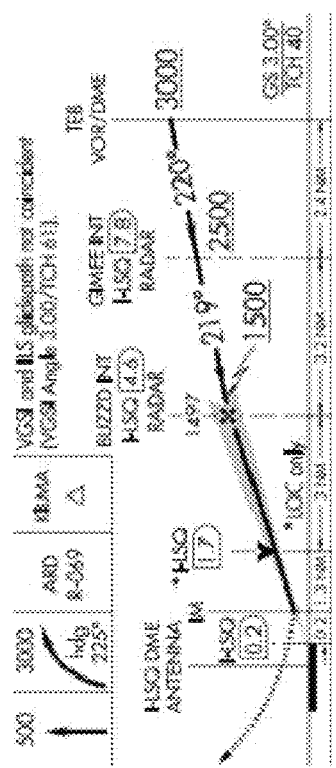
FIG. 14 is an instrument approach procedure.

Airport data and the navigation information are processed to build the approach zone. The navigation procedures can be obtained from the airport approach charts. An example specification is shown in FIG. 14, part of an approach diagram.

Figure 15:
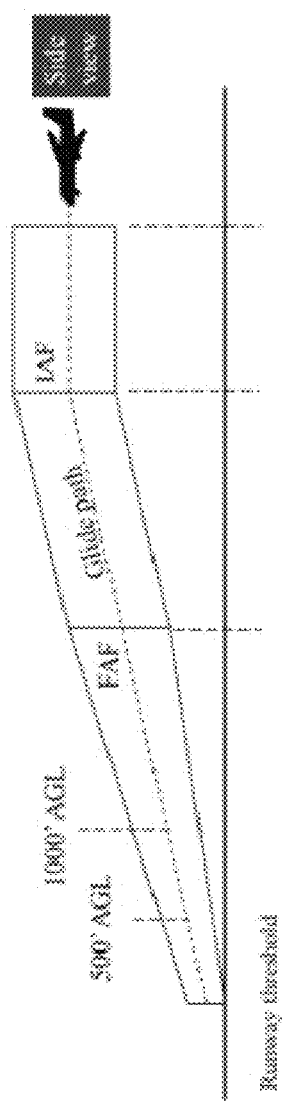
FIG. 15 is a wireframe approach zone side view.
Figure 16:
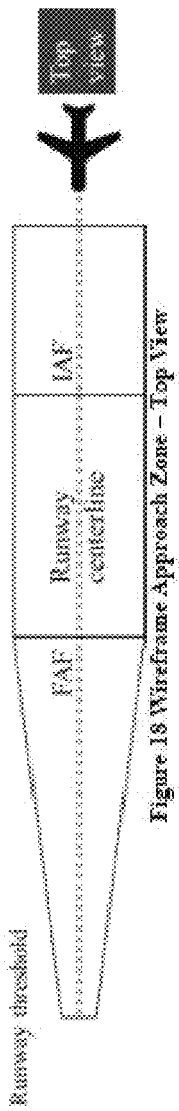
FIG. 16 is a wireframe approach zone top view.

With the airport data and the navigation procedures, a conceptual approach zone can be built for each runway. The approach zone can be represented in a wireframe structure. The wireframe starts at the level flight segment before descending (e.g. 12 nm from runway threshold for Runway 22L at EWR). Before reaching the Initial Approach Fix (IAF), the wireframe zone is level, representing the level flight segment before descending. After passing the IAF, the approach path follows the prescribed glide-path angle, which is usually 3 degrees. The landing aircraft is expected to follow the glide-path and cross the runway threshold at a specified crossing height. FIGS. 15 and 16 show the idea of the wireframe approach zone. The three-dimensional approach wireframe model is built for each runway for each approach type (e.g. Visual and ILS). The modeled zone is defined by the specific heading, elevation, threshold crossing height, threshold position, and glide-path angle at each runway. The beginning segment of the approach starts from the IAF to the reference fix (e.g. FAF) at about 6 nm: the final approach segment starts from FAF to the runway threshold.

The lateral and vertical sizes of the wireframe structure are determined by the cross-sectional position distributions of landing flights. This study determines the wireframe sizes so that 95% of flights are within the wireframe boundaries at the FAF (about 6 nm) and the runway threshold (i.e. 0 nm). In between the FAF and runway threshold, the approach zone is determined by linearly connecting the wireframe coordinates. The wireframe size beyond the FAF is the same as at the FAF.

This wireframe region is a region containing the majority of landing trajectories. The purpose of building the wireframe is to:

Determine whether a flight is on track (hence determine whether the stabilized approach criteria are violated).

Identify glide-path/centerline acquisition positions,

Identify boundaries for binning state variables of lateral/vertical position for nowcasting methods.

Landing Runway Identification

Since there is no landing runway information recorded in the original data, a method to automatically identify the landing runway from a flight track is needed. A heuristic algorithm is developed to detect the landing runway for each arrival flight. The approach is to search backward from the last track point (on or near runway threshold). If the track point is inside any modeled wireframe for a particular runway, the following variables are calculated:

Distance traveled inside the wireframe d.

Time spent inside a wireframe I.

Angle difference with runway centerline $\alpha$.

Distance from the corresponding runway threshold D.

The criteria are summarized in Table 7. If all of these conditions are satisfied by the track points from the time the aircraft enters the wireframe until the last point, then the landing runway of the flight is the runway corresponding to the modeled wireframe.

TABLE 7

Parameters and Criteria for Landing Runway Identification

| Parameters | Description | Criteria | Thresholds |
|---|---|---|---|
| d | Distance traveled inside a wireframe | $d > d_{threshold}$ | 50 meters |
| t | time spent inside a wireframe | $t > t_{threshold}$ | 3 seconds |
| $\alpha$ | angle difference from runway centerline | $\alpha < \alpha_{threshold}$ | $\pi/4$ |
| D | distance from runway threshold | $D < D_{threshold}$ | 3 nautical miles |

This method has been validated by visual checking the landing runways of hundreds of sample arrival flights. Supervised learning techniques can be used to optimize the threshold parameters and improve the degree of automation and performance of this rule-based method.

Flight Track Qualification

The surveillance track data may contain flights with incomplete track data. A qualification procedure is a final step in preprocessing the raw data sets. To filter tracks, the prediction model focuses only on the qualified flight tracks which satisfy all the following criteria:

The landing runway is identified.

The aircraft type information is known.

The flight track has entered a wireframe approach zone.

The altitude of the first track point is greater than 3000 ft. AGL.

The altitude of the last track point is less than 500 ft. AGL.

The distance from the first available track point to the landing runway threshold is larger than 12 nm.

The distance from the last track point to the landing runway threshold is smaller than 3 nm.

The time duration from first entrance of the wireframe zone to the final landing is less than 400 seconds.

The case study disclosed shows that most of the flights (98.6%) in the surveillance track data have their tracks satisfying these qualification conditions. The last condition is used to filter out the flights with multiple approaches. A go-around is an example of such a case. These abnormal flight track patterns are included in the summary, e.g. go-around statistics, but not for prediction of unstable approaches. One reason is that some state variables, such as rate of descent, for these abnormal flights can be inconsistent with those of qualified tracks. As a result, the performance measures (e.g. speed change from 1000' AGL to runway threshold) for these flights can be misleading.

Extracting State Variables at Key Locations

To define the risk events related to an unstable approach using flight track data, it is essential to first identify the track points which mark key events along the approach path. Such events include lateral/vertical acquisition of wireframe, acquiring 1000'/750'/500' AGL, and acquiring 10 nm/6 nm/3.5 nm, etc. For example, a type of key track points is featured by being at key horizontal distances from runway threshold. The algorithm to identify the track point which is at a specific distance from some key location is presented in pseudocode below:

```
dist difference = M;
for (i = 1; i <= track_size; i = i + 1)
{
    current_dist = distance(P(i), KEY);
    if abs(current_dist − target_dist) <
    dist_difference
    {
        Dist_difference = distance(P(i), KEY);
        i_dist = i;
    }
}
return P(i_dist)
```

In this script, M is an arbitrarily big number (e.g. $10^5$ m). "P(i)" is the track point with index i. KEY is any key location (e.g. threshold of the landing runway). "abs( )" calculates the absolute value. "distance( )" calculates the two-dimentional or three-dimentional distance between two points depending on the type of key events (e.g. for detecting acquisition of FAF, 3-D distance is applied; for detecting where an aircraft reaches some specific horizontal distance from runway threshold, 2-D distance is used). The index i_dist is for the track points at key horizontal distances. The "target_dist" is the indicated distance from the key location. If the task is to find the track point closest to the key location, then target_dist is set zero. The algorithm chooses the last track point at key distances from some key locations if there are multiple qualified points. The state variables of identified points will be used as features for nowcasting unstable approaches.

Another class of points are the points corresponding to the fixes along the approach path. These points are detected in a way that they are closest in proximity to the target fixes. The target fixes include the runway threshold, and 1 to 12 nm from the runway threshold along the approach path. For example, for EWR Runway 22L, the flight state at the track point that is closest to 10 nm from the runway threshold is used to approximate its performance at the FAF.

Figure 17:
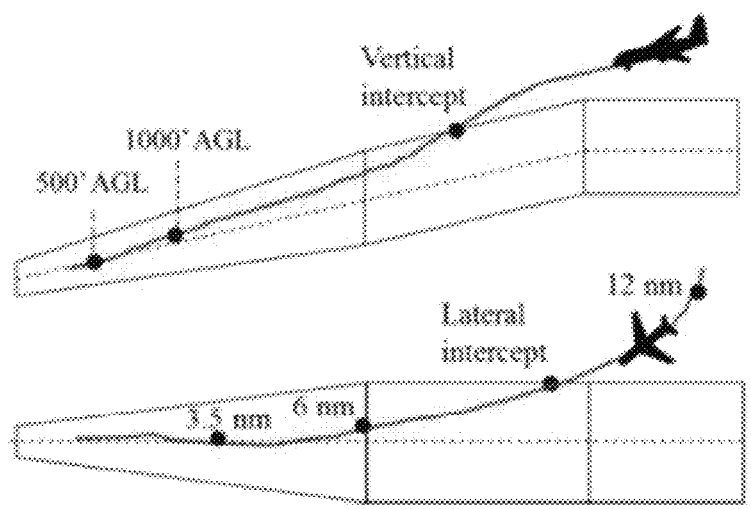
FIG. 17 is a representation of key locations and corresponding track points.

Other types of key track points include the wireframe entrance points and the target altitude points. The wireframe entrance points correspond to the moment when an aircraft first enters the modeled wireframe approach zone. The target altitude track points indicate where the flights capture the target altitude levels such as 1000'/500' AGL. Examples of these points are shown in FIG. 17.

With all these track points at key locations identified, the aircraft state variables at these locations can be obtained, for example, the airspeed at the moment when a landing aircraft captures 1000 ft. AGL. These state variables quantitatively determine whether a landing flight satisfy the stabilized approach criteria.

Identification of Unstable Approach Events

The purpose of processing flight track data, wind data, and building the wireframe model is to form the quantitative criteria for determining a stabilized approach. With the state variables of a landing aircraft at key locations along the final approach path extracted, the identification of unstable approach events can be achieved.

Defining Unstable Approach Events

In an aspect, the criteria used herein are developed based on the original stabilized approach criteria given by different airlines/regulators, which focuses on applying processed flight track data and navigation procedures. Specifically, example criteria used herein are as follows:

The aircraft should acquire the glide-path by maintaining its position within the defined vertical boundary of the wireframe after reaching 1000'/500' AGL.

The aircraft should acquire the runway centerline by maintaining its position within the defined lateral boundary of the wireframe after reaching 1000'/500' AGL.

At 1000'/500' AGL the aircraft airspeed should remain within ±10 knots of the airspeed at the runway threshold (i.e. landing speed).

From 1000'/500' AGL to the runway threshold, the rate of descent should not be greater than 1000 feet per minute for more than 10 seconds:

If any of these four conditions is not satisfied, the stabilized approach criteria are not met, and an overall unstable approach event occurs for the corresponding stabilization altitude.

It should be noted that these derived stabilized approach criteria are a subset of the original criteria used in airlines or defined by organizations. For example, criteria related to aircraft configuration are not included in the previous definition, since aircraft configuration is not available in the surveillance track data.

Defining Unstable Approach Sub-Events

Following the criteria developed for identifying unstable approaches, a list of sub-events of unstable approaches can be defined. These sub-events are introduced in Table 8. These sub-events are the necessary events for the overall event. If any sub-event occurs, the approach is unstable.

TABLE 8

Unstable Approach Events

| Unstable Event | Definition |
|---|---|
| Unstable approach | Aircraft is classified as unstable if any following sub-event occurs |
| Unstable speed (deceleration) | Difference of averaged ground speed $v_{1000'/500'} - v_{THR} > 10$ knots |
| Unstable speed (acceleration) | Difference of averaged ground speed $v_{1000'/500'} - v_{THR} > 10$ knots |
| Excessive rate of descent | Rate of descent >1000 feet per minute for more than 10 seconds |
| Short acquisition from above | Acquisition of glide-path from above after stabilization point |
| Short acquisition from below | Acquisition of glide-path from below after stabilization point |
| Short acquisition from left side | Acquisition of runway centerline from left side after stabilization point |
| Short acquisition from right side | Acquisition of runway centerline from right side after stabilization point |

Figure 18:
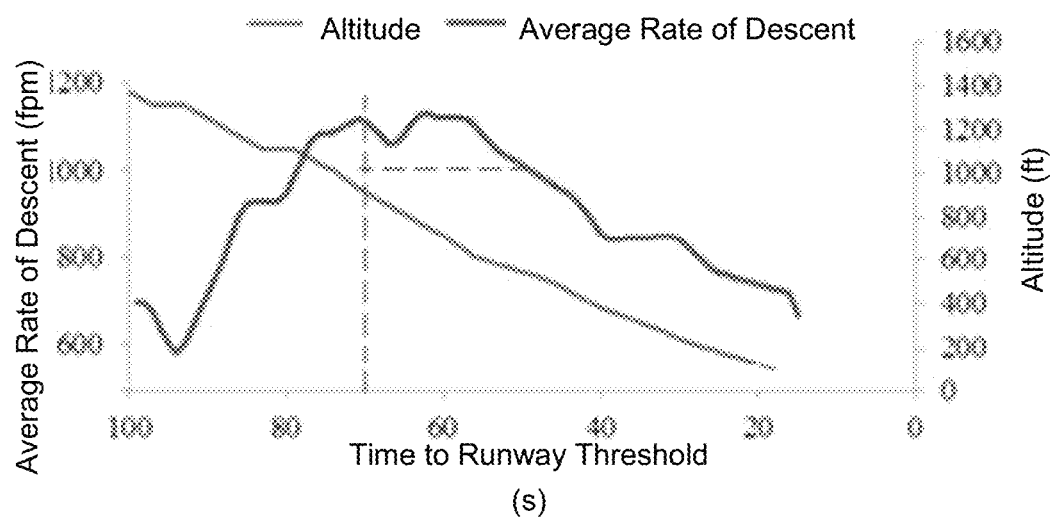
FIG. 18 is a graph of excessive rate of descent.

In the definition of Unstable Speed events, $v_{1000'/500'}$ represents the airspeed when aircraft captures 1000'/500' AGL and $v_{THR}$ represents the aircraft airspeed at runway threshold. In defining the excessive rate of descent event, a time duration is used to filter out possible noises. For example, FIG. 18 shows a sample flight's altitude and rate of descent profile during final approach. If it captures 1000' AGL at 70 seconds from touchdown, it can be seen that its rate of descent is higher than 1000 feet per minute for more than 10 seconds after capturing 1000' AGL, then the event of excessive rate of descent occurs.

Nowcasting by Conditional Probability Method

A basic question is: historically, given the similar conditions for current flight, what is the probability that an unstable approach occurred after acquiring stabilization altitude? The idea of conditional probability method is to answer such a question. With the probability obtained, it can be used as a criterion for nowcasting whether an approach is stable or not.

To answer the question above, a table of conditional probabilities is needed. The conditions are expressed in combination of binned state variables. The corresponding probabilities are estimated by obtaining the proportion of flights which fall into this condition (i.e. combination of state variable categories) that experienced unstable approaches.

This method starts with determining and binning the state variables. First, the number of bins for each variable needs to be specified, for example, 3 categories for airspeed ("low", "normal", "high"). Then the boundaries for each variable need to be defined for binning. For example, for lateral/vertical position, the wireframe boundary can be used.

A condition mean a combination of binned state variables. The output format of this method is hence a table of conditional probabilities. The contents of each cell such table include: number of samples, observed proportion of target unstable event (i.e. the estimated probabilities under corresponding condition), and derived confidence interval. The confidence interval for proportions depends not only on the number of samples, but also on the probability of target event. Equation 7 gives the form of confidence interval for estimating mean of proportions. In this formula, CI represents the confidence interval, $\bar{p}$ is the observed probability of target event, n is the sample size, and $z_{\alpha/2}$ is the value for the standard normal random variable corresponding to an area of $\alpha/2$ in the upper tail of the distribution, where a is the prescribed significance level. With a probability of $(1-\alpha)$ the mean proportion is within the confidence interval.

Confidence Interval for Proportion Mean $$CI = \bar{p} \pm z_{\alpha/2} \sqrt{\frac{\bar{p}(1-\bar{p})}{n-1}} \quad \text{Equation 7}$$

For some cells, the results may be less reliable due to limited number of samples and the value of conditional probability. To deal with the various confidence levels of calculated probabilities in each cell, a threshold for minimum confidence level is needed. If the confidence interval computed in a cell exceeds the minimum range, the probability calculated from this cell will not be reported. For example, to filter out results with inadequate confidence, a confidence threshold can be set (e.g. ±10%). Then, the results will not be reported if there is insufficient confidence level.

To apply Equation 7, a basic assumption is needed that the sampling distribution of proportion mean follows normal distribution. This assumption approximately holds when $np \geq 5$ and $n(1-p) \geq 5$. An alternative way is to set a threshold for number of samples n.

In summary, the criteria for reporting the conditional probability is as below:
1. Minimum number of samples is reached. (e.g. >20 in each combination)
2. Confidence level is sufficient (e.g. CI within [−10%, 10%])

For cells with enough samples and sufficient confidence levels, the following criteria are applied to nowcast the unstable approach events:

Conditional probability is relatively higher than the unconditional probability P (e.g. 1.2*P)

If the ratio (conditional probability over unconditional probability) is less than the predefined level, flights under this condition are predicted stable. If the ratio is higher than the predefined level, then the flights are nowcasted unstable.

To apply this method of nowcast, basic information such as landing runway, aircraft weight class, distance to destination etc. need to be set first. Different runways can have different landing procedures, wind conditions, etc. Each scenario corresponds to a different probability table.

This method needs a large amount of data, which is a major limitation. As the number of variables and categories increase, the number of cells which contains not enough sample data to compute the probability of unstable approaches increases dramatically. Cells with insufficient confidence levels are not applicable for reporting. In an aspect, a conditional probability method has shown that the possibility of adding more than four features may be prevented given current amount of available data.

Nowcasting by Supervised Learning

Supervised Learning is a classification approach in the field of Machine Learning. Supervised learning models are trained by first feeding the model with samples, each having their features and outcome known. After the model parameters are trained with sufficient samples, the model can be used to automatically classify the outcomes given the features of new samples.

The features are the various state variables, and the outcomes are the unstable approach events. The classification problem can also be seen as prediction or nowcasting problem, where the output of the model indicate whether a flight will experience unstable approach events or not given features at the nowcasting location.

Logistic regression is one of these models which is often used for classification and prediction. A logistic regression model is developed to establish the relationship between these features and the outcome of stable/unstable approaches. The mathematical expression is given in the following equation:

Hypothesis Function $$h_\theta(x) = \frac{1}{1+e^{-\theta x}} \quad \text{Equation 8}$$

In this equation, $h_\theta(x)$ is the probability that a flight with features x ends up in an unstable approach, where x is a vector containing the feature values and $\theta$ is a vector containing the regression coefficients.

The optimal coefficients can be found by minimizing the cost function $J(\theta)$ given below:

Cost Function $$J(\theta) = -\frac{1}{m}\sum_{i=1}^{m}[y^{(i)}\log h_\theta(x^{(i)}) + (1-y^{(i)})\log(1-h_\theta(x^{(i)}))] \quad \text{Equation 9}$$

In this formula, m is the number of training samples and i is the index for samples. $y^{(i)}$ is the actual outcome of sample i, which is equal to 1 if sample flight i ends up with unstable approach, otherwise $y^{(i)}$=0. Log is the natural logarithm. The Gradient Descent method is applied to find the optimal coefficient θ. The coefficients updating procedure is shown in Equation 10, where j is the index for features and parameter a controls the step length. The term following α is the gradient $$\frac{\partial J(\theta)}{\partial \theta_j}.$$

Gradient Descent Algorithm $$\theta_j := \theta_j - \alpha \frac{1}{m}\sum_{i=1}^{m}(h_\theta(x^{(i)}) - y^{(i)})x_j(i) \quad \text{Equation 10}$$

As inputs to the model, all features are mean normalized using Equation 11, where x is the original feature value, μ is the mean value of the feature for all samples of training data, and σ is the standard deviation. The purpose of normalization is to keep the efficiency of the algorithm.

Mean Normalization $$z = \frac{x - \mu}{\sigma} \quad \text{Equation 11}$$

In application, the degree of the polynomial θx can be set to integer value greater than one to derive more features based on the basic input features so the model can provide better fits. For example, if the degree of polynomial is set 2, then the potential interactions between features are considered in the model. To be specific, assuming the number of basic features is m, the number of total features will be the m basic features+m squared features+m-choose-2 interaction features.

Evaluating Performances of Prediction Models

Several measures are applied to quantify the performances of the models.

They are accuracy, recall, prediction precision, and F1 Score.

The accuracy is an overall measure which reflects the model performance for all samples of stable and unstable flights. When the classes are skewed, this measure can be misleading. For example, when a very small portion of flights experienced unstable approach, even if the model performs very poor on predicting unstable approaches (but good in predicting stable approaches), the total accuracy can still be high due to large numbers of stable flights. To overcome this issue, additional measures are needed.

The recall is the proportion of actual unstable approaches that have been correctly predicted. The precision represents the proportion of actual unstable approaches within predicted unstable approaches.

F1 Score is an aggregate measure of recall and precision. The decision makers can choose to accept the results if the F1 Score is above some predefined level. The definition of F1 Score is given below in Equation 12, where P and R stand for precision and recall.

F1 Score $$F1\ \text{Score} = \frac{2PR}{P+R} \quad \text{Equation 12}$$

Figure 19:
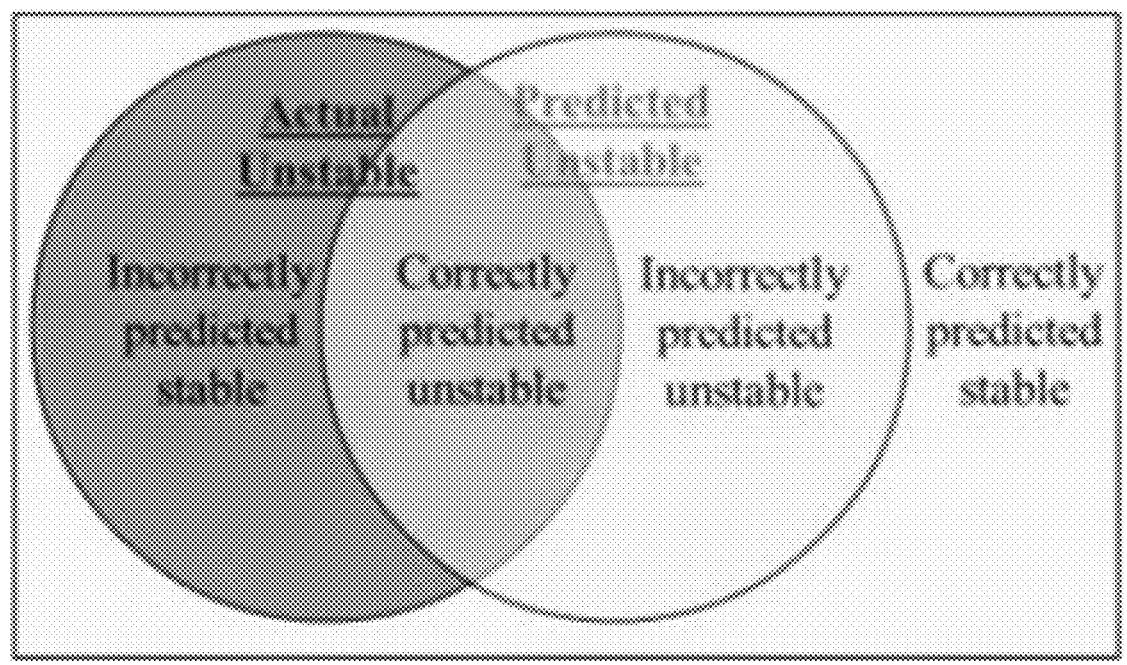
FIG. 19 is a representation of relationships between predicted and actual stable/unstable flights.

The relationships and the calculations of these measures are shown in FIG. 19 and Table 9.

TABLE 9

Performance Measures Flights

| Measure | Definition |
| --- | --- |
| Accuracy | $\frac{\#\text{correct predictions}}{\#\text{all approaches}}$ |
| Precision | $\frac{\#\text{correctly predicted unstable}}{\#\text{predicted unstable}}$ |
| Recall | $\frac{\#\text{correctly predicted unstable}}{\#\text{actual unstable}}$ |
| F1 Score | $\frac{2 * \text{Precision} * \text{Recall}}{\text{Precision} + \text{Recall}}$ |

These measures are directly applicable to conditional probability method. For supervised learning method, the data set are randomly split into training set and test set. Training set is used to train the model parameters (i.e. the coefficients for features) by minimizing the cost function. The measures of performance are applicable only toward the test set.

FIG. 20 is a flowchart 2000 of an example method. Beginning with step 2002, a predictive model based on a plurality of historical aircraft performances can be generated. In an aspect, each of the historical aircraft performances can describe a respective approach of a respective aircraft to a given runway. In an aspect, each of the historical aircraft performances can correspond to a same runway. In an aspect, each of the historical aircraft performances can describe one or more attributes of state of the respective aircraft during the respective approach. For example, the one or more attributes can include an airspeed at a predefined distance from a runway, an altitude at the predefined distance from the runway, an angle difference between a course and a centerline at the predefined distance from the runway, or a distance from a deceleration point to a current position. In an aspect, each of the historical aircraft performances can indicate whether the respective approach was an unstable approach or a stable approach. In an aspect, the respective approach can be indicated as stable if each of one or more of conditions are satisfied. Accordingly, the respective approach can be indicated as unstable if any of the one or more of conditions is unsatisfied. In an aspect, the one or more conditions can include: whether the respective aircraft is inside the boundaries of a wireframe, whether a change in airspeed is less than ten knots, and whether the rate of descent is not greater than 1000 feet per minute for more than ten seconds after reaching 1000' (or 500') AGL. Thus, generating a predictive model can include determining a relationship between the one or more attributes of the respective approach and whether the respective approach was stable or unstable.

Next, in step 2004, a projected state of an aircraft can be determined. In an aspect, the projected state can be determined based on the predictive model and a current wind condition for the aircraft. In an aspect, the current wind condition can include one or more of: a crosswind speed, a crosswind speed magnitude, a headwind, or a gust. After determining the projected state of the aircraft, a projected unstable approach can be determined in step 2006. In an aspect, the projected unstable approach can be determined by comparing the projected state of the aircraft to the one or more conditions for a stable or unstable approach set forth in step 2002.

In an exemplary aspect, the methods and systems can be implemented on a computer 2101 as illustrated in FIG. 21 and described below. Similarly, the methods and systems disclosed can utilize one or more computers to perform one or more functions in one or more locations. FIG. 21 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2101. The components of the computer 2101 can comprise, but are not limited to, one or more processors 2103, a system memory 2112, and a system bus 2113 that couples various system components including the one or more processors 2103 to the system memory 2112. The system can utilize parallel computing.

The system bus 2113 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 113, and all buses specified in this description can also be implemented over a wired or wireless network connection and each of the subsystems, including the one or more processors 2103, a mass storage device 2104, an operating system 2105, predictive software 2106, predictive data 2107, a network adapter 2108, the system memory 2112, an Input/Output Interface 2110, a display adapter 2109, a display device 2111, and a human machine interface 2102, can be contained within one or more remote computing devices 2114a,b,c at physically separate locations, connected through buses of this form, in effect implementing a fully distributed system.

The computer 2101 typically comprises a variety of computer readable media. Exemplary readable media can be any available media that is accessible by the computer 2101 and comprises, for example and not meant to be limiting, both volatile and non-volatile media, removable and non-removable media. The system memory 2112 comprises computer readable media in the form of volatile memory, such as random access memory (RAM), and/or non-volatile memory, such as read only memory (ROM). The system memory 2112 typically contains data such as the predictive data 2107 and/or program modules such as the operating system 2105 and the predictive software 2106 that are immediately accessible to and/or are presently operated on by the one or more processors 2103.

In another aspect, the computer 2101 can also comprise other removable/non-removable, volatile/non-volatile computer storage media. By way of example, FIG. 21 illustrates the mass storage device 2104 which can provide non-volatile storage of computer code, computer readable instructions, data structures, program modules, and other data for the computer 2101. For example and not meant to be limiting, the mass storage device 2104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2104, including by way of example, the operating system 2105 and the predictive software 2106. Each of the operating system 2105 and the predictive software 2106 (or some combination thereof) can comprise elements of the programming and the predictive software 2106. The predictive data 2107 can also be stored on the mass storage device 2104. The predictive data 2107 can be stored in any of one or more databases known in the art. Examples of such databases comprise, DB2, Microsoft® Access, Microsoft® SQL Server, Oracle®, mSQL, PostgreSQL, and the like. The databases can be centralized or distributed across multiple systems.

In another aspect, the user can enter commands and information into the computer 2101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 2103 via the human machine interface 2102 that is coupled to the system bus 2113, but can be connected by other interface and bus structures, such as a parallel port, game port, an IEEE 1394 Port (also known as a Firewire port), a serial port, or a universal serial bus (USB).

In yet another aspect, the display device 2111 can also be connected to the system bus 2113 via an interface, such as the display adapter 2109. It is contemplated that the computer 2101 can have more than one display adapter 2109 and the computer 2101 can have more than one display device 2111. For example, the display device 2111 can be a monitor, an LCD (Liquid Crystal Display), or a projector. In addition to the display device 2111, other output peripheral devices can comprise components such as speakers (not shown) and a printer (not shown) which can be connected to the computer 2101 via the Input/Output Interface 2110. Any step and/or result of the methods can be output in any form to an output device. Such output can be any form of visual representation, including, but not limited to, textual, graphical, animation, audio, tactile, and the like. The display device 2111 and computer 2101 can be part of one device, or separate devices.

The computer 2101 can operate in a networked environment using logical connections to one or more remote computing devices 2114*a,b,c*. By way of example, a remote computing device can be a personal computer, portable computer, smartphone, a server, a router, a network computer, a peer device or other common network node, and so on. Logical connections between the computer 2101 and a remote computing device 2114*a,b,c* can be made via a network 2115, such as a local area network (LAN) and/or a general wide area network (WAN). Such network connections can be through the network adapter 2108. The network adapter 2108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2105 are illustrated herein as discrete blocks, although it is recognized that such programs and components reside at various times in different storage components of the computing device 2101, and are executed by the one or more processors 2103 of the computer. An implementation of the predictive software 2106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media" "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, including in the Appendix, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

APPENDIX: REFERENCES

Andrews, J., and J. Robinson. (2001). *Radar-Based Analysis of the Efficiency of Runway Use*. Guidance AIAA-2001-4359. Presented at Navigation and Control Conference, American Institute of Aeronautics and Astronautics, Montreal, Quebec, Canada, 2001.

Chandola, Varun, A. Banerjee, and V. Kumar. (2009). *Outliner detection: A survey*. ACM Computing Surveys: 1-72.

Darby. R. (2010). *Safety in Numbers*. Aerosafety world; 2010 p. 48. Retrieved from http://flightsafety.org/aerosafety-world-magazine/july-2010/safety-in-numbers
DGAC. (2006). Direction Générale de l'Aviation Civil. *Unstabilised Approaches*—the symposia.
EUROCONTROL. (2012). Base of Aircraft Data (BADA) v3.8|EUROCONTROL. Retrieved Nov. 25, 2012. http://www.eurocontrol.int/services/bada FAA. (2003). *Advisory Circular.* 120-71a Standard Operating Procedures for Flight Deck Crewmembers, Washington, D.C.
FAA. (2004). *Advisory Circular.* 120-82 *Flight Operational Quality Assurance*, Washington, D.C.
FAA. (2006). *Stabilized Approach Concept*. Retrieved from https://www.faasafety.gov/files/gslac/courses/content/35/376/Stabilized %20Approach%20Concept.pdf.
FSF. (1999). *Killers in Aviation: FSF Task Force Presents Facts About Approach-and-landing and Controlled-flight-into-terrain Accidents*. Flight Safety Digest Volume 17 (November-December 1998) and Volume 18 (January-February 1999): 1-121.
FSF. (2010). *FSFAIAR Briefing Note 7.1 Stabilized approach*. Retrieved from http://www.skybrary.aero/bookshelf/content/bookDetails.php?bookId=864. Hall. T., M. Soares. (2008). *Analysis of Locazer and Glide Slope Flight Technical Error.* 27th Digital Avionics Systems Conference, St. Paul, Minn.
Hall, T., M. Soares. (2008). *Analysis of Localizer and Glide Slope Flight Technical Error.* 27th Digital Avionics Systems Conference, St. Paul, Minn.
Haynie, C. (2002). *An Investigation of Capacity and Safety in Near-terminal Airspace Guiding Information Technology Adoption*. PhD dissertation. George Mason University, Fairfax, Va.
ICAO. (2014). Safety Report 2014. Retrieved from http://www.icao.int/safety/Documents/ICAO_2014%20Safety%20Report_final_0 2042014_web.pdf
Jeddi, B., J. F. Shortle, and L. Sherry. (2006). *Statistics of the Approach Process at Detroit Metropolitan Wayne County Airport*. Proc., International Conference on Research in Air Transportation, Belgrade, Serbia, and Montenegro, pp. 85-92.
Jeddi, B., J. Shortle. (2007). Throughput, risk, and economic optimality of runway landing operations. 7th USA/Europe ATM R&D Seminar. Barcelona, Spain, Paper 162.
Li, L, M. Gariel, R. Hansman, and R. Palacios. (2011). *Anomaly detection in onboard recorded flight data using cluster analysis*. in Proc. 30th IEEE/AIAA Digital Avionics Systems Conference (DASC), October 2011. pp. 4A4-1-4A4-11.
Matthews, B., S. Das, K. Bhaduri., K. Das., R. Martin., N. Oza. (2013) *Discovering Anomalous Aviation Safety Events using Scalable Data Mining Algorithms*. AIAA Journal of Aerospace Computing, *Information, and Communication*. 2013.
Matthews, B., Nielsen, D. (2014). *Automated Discovery of Flight TrackAnomalies*. In Proc. 33th IEEE/AIAA Digital Avionics Systems Conference (DASC), October 2014. McGovern, S. M., S. B. Cohen: M. Truong; G. Farley. *Kinematics-Based model for Stochastic Simulation of Aircraft Operating in the National Airspace System*. US DOT National Transportation Systems Center, EG&G Technical Services 39173.
Merritt A, J. R. Klinect. (2006). *Defensive Flying for Pilots: An Introduction to Threat and Error Management*. The University of Texas human factors research project.
Miquel, T., M. Felix, L. Jean-Marc. (2006). *Path Searching and Tracking for Time-Based Aircraft Spacing at Meter Fix*. Direction des Services de la Navigation Aerienne, Ecole National de l'Aviation Civile.
Moriarty, D., S. Jarvis. (2014). *A systems perspective on the unstable approach in commercial aviation*. Reliability Engineering & System Safety, 131, 197-202.
Musialek, B., C. F. Munafo, H. Ryan, M. Paglione. (2010). *Literature Survey of Trajectory Predictor Technology*. Technical Report DOT/FAA/TCTN11/1, Federal Aviation Administration, William J. Hughes Technical Center
Rakas, J., and H. Yin. (2005). *Statistical Modeling and Analysis of Landing Time Intervals: Case Study of Los Angeles International Airport, California*. In Transportation Research Record: Journal of the Transportation Research Board, No. 1915. Transportation Research Board of the National Academies, Washington, D.C., 2005, pp. 69-78.
Richards, R. (2002). *Application of multiple artificial intelligence techniques for an aircraft carrier landing decision support tool*. In Fuzzy Systems, 2002. FUZZIEEE'02. Proceedings of the 2002 IEEE International Conference on (Vol. 1, pp. 7-11). IEEE.
Rodriguez, J. M. C., et al. *A model to 4D descent trajectory guidance*. Digital Avionics Systems Conference, 2007. DASC'07. IEEE/AIAA 26th. IEEE, 2007.
Sherry, L., Z. Wang, H. Kourdali, J. Shortle. (2013). *Big data analysis of irregular operations: aborted approaches and their underlying factors*. Integrated Communication, Navigation, and Surveillance Conference, Herndon, Va.
Shortle, J., B. Jeddi. (2007). *Probabilistic Analysis of Wake Vortex Hazards for Landing Aircraft Using Multilateration Data*. Transportation Research Record: Journal of the Transportation Research Board. No. 2007, 90-96.
Shortle, J., Y. Zhang, J. Wang. (2010). *Statistical Characteristics of Aircraft Arrival Tracks*. Transportation Research Record: Journal of the Transportation Research Board. No. 2177, 98-104.
Shortle. J., L. Sherry. (2013). *A Model for Investigating the Interaction between Go-Arounds and Runway Throughput*. 2013 Aviation Technology, Integration, and Operations Conference.
Thipphavong, D. P., C. A. Schultz, A. G. Lee, and S. Chan. (2013). *Adaptive Algorithm to Improve Trajectory Prediction Accuracy of Climbing Aircraft*. Journal of Guidance. Control, and Dynamics. 36(1), p. 15-24.
Treder, B., B. Crane. (2004) *Application of Insightful Corporations Data Mining Algorithms to FOQA Data at JetBlue Airways*. Flight Safety Foundation Report. Retrieved from http:/flightsafety.org/files/FOQA-_data_mining_report.pdf.
Turner, T. (2011). *Flying Lessons*—111208. Retrieved from http://www.faasafety.gov/files/slac/library/documents/2011/Dec/59270/111208%2 0FLYING%20LESSONS.pdf.
Wang, Z., J. Wang, J. F. Shortle. (2012). *Sensitivity Analysis of Potential Wake Encounters to Stochastic Flight-Track Parameters*. In Fifth International Conference on Research in Air Transportation. University of California, Berkeley, May 22-25.
Wang, Z, L. Sherry, and J. Shortle. (2015) *Airspace Risk Management Using Surveillance Track Data: Stabilized Approaches*. 8th Integrated Communications Navigation and Surveillance (ICNS) Conference. Dulles, Va.
Xie, Y. (2005). *Quantitative Analysis of Airport Arrival Capacity and Arrival Safety Using Stochastic Models*. PhD dissertation, George Mason University, Fairfax, Va.
Zhang, Y., J. F. Shortle. (2010). *Comparison of Arrival Tracks at Different Airports*. In Proceedings of 4th International Conference on Research in Air Transportation, Budapest Hungary, June 01-04.

What is claimed is:

1. A method, comprising:
   training a predictive model for unstable approach using a plurality of historical aircraft performances;
   determining a projected state of an aircraft based on the trained predictive model, a current state of the aircraft, and at least one current wind condition associated with the aircraft;
   determining, based on the projected state of the aircraft, that one or more unstable approach conditions are satisfied; and
   displaying, based on the one or more unstable approach conditions being satisfied, an indication of a projected unstable approach.

2. The method of claim 1, wherein the at least one current wind condition comprises one or more of: a crosswind speed, a crosswind speed magnitude, a headwind, or a gust.

3. The method of claim 1, wherein the current state of the aircraft comprises one or more of: a current lateral deviation absolute value, a current vertical deviation absolute value, a current average airspeed deviation from a baseline average airspeed, or a current average rate of descent deviation from a baseline rate of descent, wherein the baseline average airspeed or the baseline rate of descent correspond to a weight class of the aircraft.

4. The method of claim 1, wherein the plurality of historical aircraft performances comprise one or more of an airspeed at a predefined distance from a runway, an altitude at the predefined distance from the runway, an angular difference between a course and a centerline at the predefined distance from the runway, or a distance from a deceleration point to a current position.

5. The method of claim 1, wherein determining the projected state of the aircraft comprises determining one or more conditional probabilities.

6. The method of claim 1, wherein determining the projected state of the aircraft comprises applying a supervised learning approach.

7. The method of claim 6, wherein applying the supervised learning approach comprises applying a logistic regression.

8. A system, comprising:
   at least one computing device configured to at least:
   train a predictive model for unstable approach using a plurality of historical aircraft performances;
   determine a projected state of an aircraft based on the trained predictive model, a current state of the aircraft, and at least one current wind condition associated with the aircraft;
   determine based on the projected state of the aircraft, that one or more unstable approach conditions are satisfied; and
   display, based on the one or more unstable approach conditions being satisfied, an indication of a projected unstable approach.

9. The system of claim 8, wherein the at least one current wind condition comprises one or more of: a crosswind speed, a crosswind speed magnitude, a headwind, or a gust.

10. The system of claim 8, wherein the current state of the aircraft comprises one or more of: a current lateral deviation absolute value, a current vertical deviation absolute value, a current average airspeed deviation from a baseline average airspeed, or a current average rate of descent deviation from a baseline rate of descent, wherein the baseline average airspeed or the baseline rate of descent correspond to a weight class of the aircraft.

11. The system of claim 8, wherein the plurality of historical aircraft performances comprise one or more of an airspeed at a predefined distance from a runway, an altitude at the predefined distance from the runway, an angular difference between a course and a centerline at the predefined distance from the runway, or a distance from a deceleration point to a current position.

12. The system of claim 8, wherein the at least one computing device is configured to determine the projected state of the aircraft by determining one or more conditional probabilities.

13. The system of claim 8, wherein the at least one computing device is configured to determine the projected state of the aircraft by applying a supervised learning approach.

14. The system of claim 13, wherein the at least one computing device is configured to apply the supervised learning approach by applying a logistic regression.

15. A non-transitory computer-readable medium encoded with executable instructions that, when executed by at least one computing device, cause the at least one computing device to at least:
   train a predictive model for unstable approach using a plurality of historical aircraft performances;
   determine a projected state of an aircraft based on the trained predictive model, a current state of the aircraft, and at least one current wind condition associated with the aircraft;
   determine based on the projected state of the aircraft, that one or more unstable approach conditions are satisfied; and
   display, based on the one or more unstable approach conditions being satisfied, an indication of a projected unstable approach.

16. The non-transitory computer-readable medium of claim 15, wherein the at least one current wind condition comprises one or more of: a crosswind speed, a crosswind speed magnitude, a headwind, or a gust.

17. The non-transitory computer-readable medium of claim 15, wherein the current state of the aircraft comprises one or more of: a current lateral deviation absolute value, a current vertical deviation absolute value, a current average airspeed deviation from a baseline average airspeed, or a current average rate of descent deviation from a baseline rate of descent, wherein the baseline average airspeed or the baseline rate of descent correspond to a weight class of the aircraft.

18. The non-transitory computer-readable medium of claim 15, wherein the plurality of historical aircraft performances comprise one or more of an airspeed at a predefined distance from a runway, an altitude at the predefined distance from the runway, an angular difference between a course and a centerline at the predefined distance from the runway, or a distance from a deceleration point to a current position.

19. The method of claim 1, wherein each of the plurality of historical aircraft performances is indicative of stable approach conditions or unstable approach conditions.

20. The system of claim 8, wherein each of the plurality of historical aircraft performances is indicative of stable approach conditions or unstable approach conditions.

* * * * *